United States Patent [19]

Redmer et al.

[11] 3,964,857
[45] June 22, 1976

[54] CONTINUOUS AUTOMATED PLASTIC INJECTION MOLDING APPARATUS FOR MAKING SYRINGES HAVING A COVERING SHEATH

[75] Inventors: Wilbert Redmer, Boca Raton; Kenneth Rolin, Del Ray Beach; Herman Nittel, Boca Raton, all of Fla.

[73] Assignee: Abbott Laboratories, North Chicago, Ill.

[22] Filed: Dec. 13, 1974

[21] Appl. No.: 532,551

Related U.S. Application Data
[62] Division of Ser. No. 241,934, April 7, 1972.

[52] U.S. Cl............................ 425/515; 425/126 R; 425/129 R
[51] Int. Cl.[2].......................................... B29D 3/02
[58] Field of Search............ 425/126 R, 126 S, 317, 425/129 R, 455, 515; 264/275

[56] References Cited
UNITED STATES PATENTS

| | | | |
|---|---|---|---|
| 2,705,857 | 4/1955 | Fox et al.......................... | 425/126 S |
| 2,929,340 | 3/1960 | Topfer............................. | 425/126 S |
| 3,135,993 | 6/1964 | Ryan................................. | 425/129 X |

*Primary Examiner*—Francis S. Husar
*Assistant Examiner*—David S. Safran

[57] ABSTRACT

Disclosed is a method and apparatus for continuously molding plastic parts. Basically, the apparatus comprises a pair of spaced, rotatable, indexable trunnion transfer units or wheels having a plurality of radles thereon for receiving and transporting carrier bars. The wheels are indexable to a number of stations at which various activities take place and are positioned on either side of the mold area of a conventional molding machine. A carrier bar having affixed thereto a plurality of cores for the part to be molded, for example, is transported by the rotating wheel from the bottom of the first wheel to a first station where an insert may be added to the core and thence to the top position of the wheel where the carrier bar is transferred to a conveyor which in turn transports the carrier bar to the mold. After completion of the molding cycle, the carrier bar with the molded parts thereon, is transported by the conveyor to the top of the second wheel where it is inserted thereon. The second wheel is then rotated to a first station where additional parts may be affixed to the molded part and thence to a second station where the molded parts are unloaded from the cores on the carrier bar. After unloading, the parts are moved by conveyor or other means for further processing or are deposited in a storage container. Thereafter, the second wheel is indexed to a third station where the empty carrier bar is transferred to an inclined track for return to the first wheel where the process is repeated. The method and apparatus can be employed to transport a carrier bar having either cores or inserts thereon depending upon the part to be molded.

6 Claims, 42 Drawing Figures

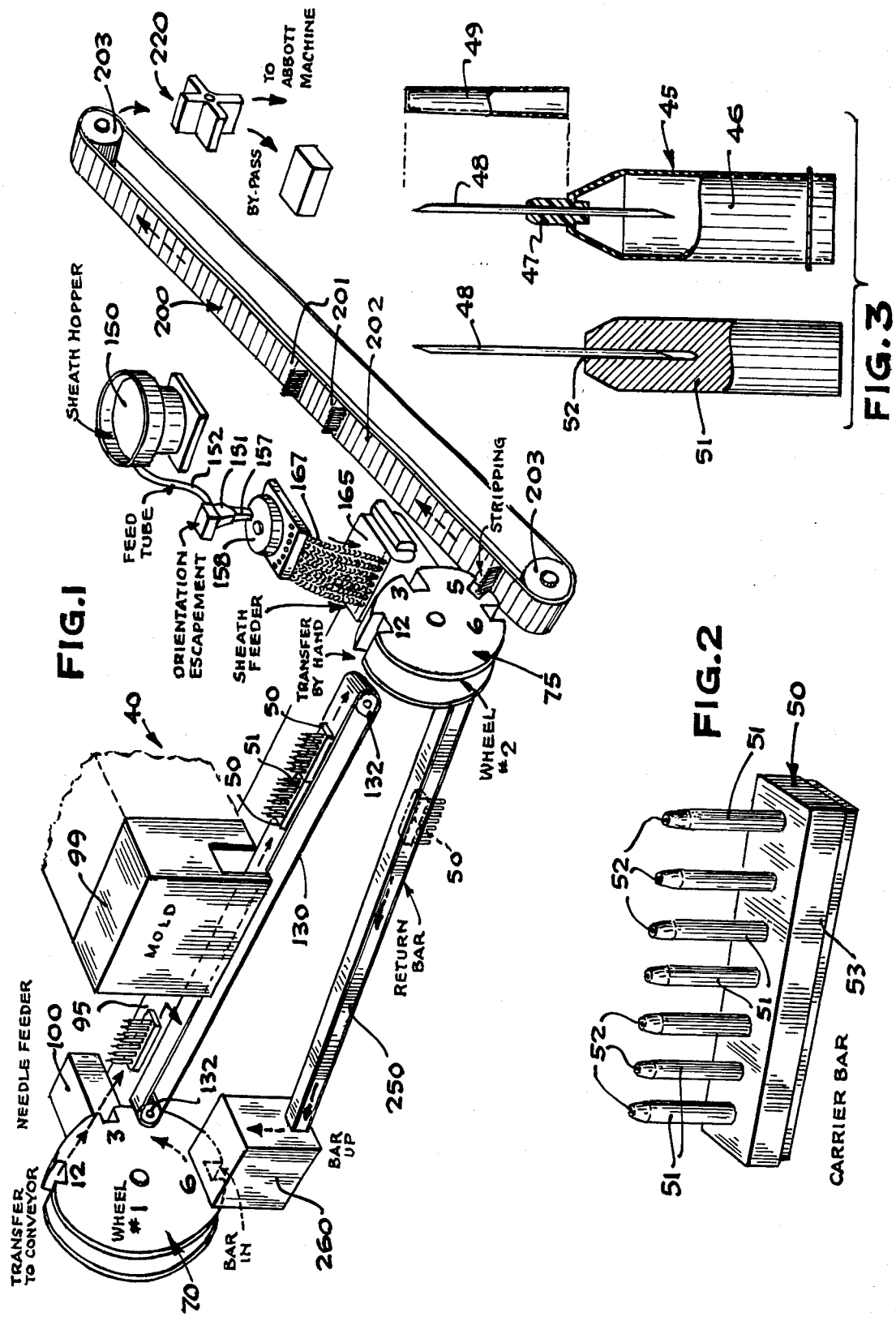

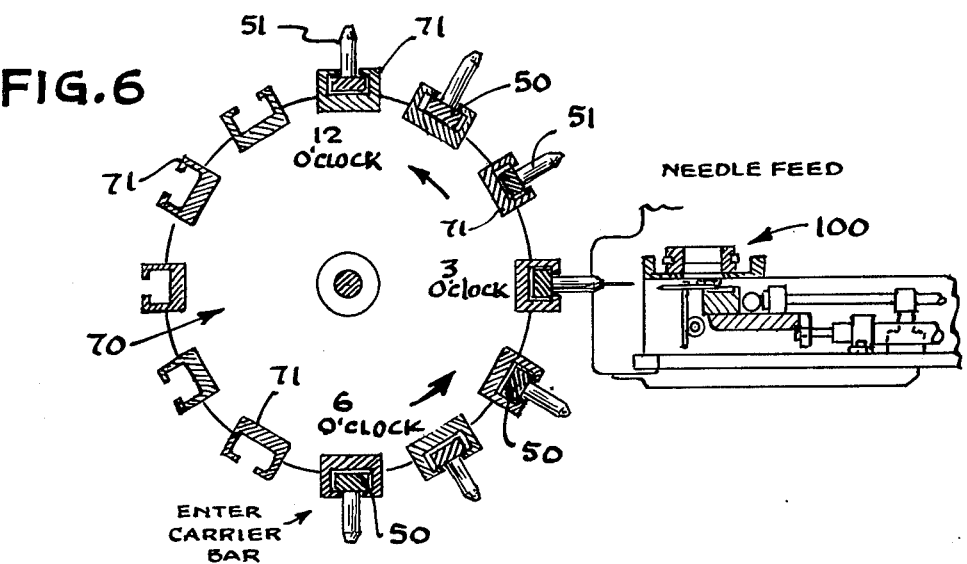
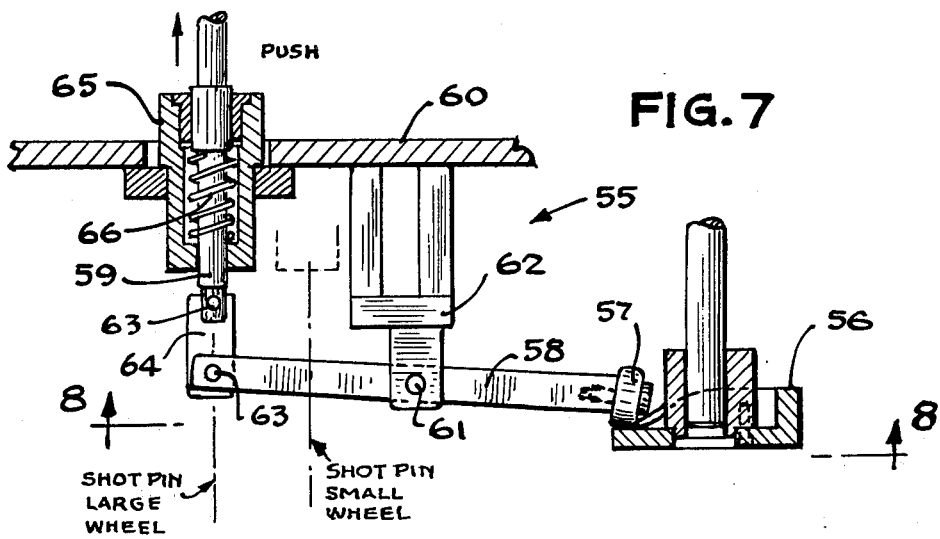
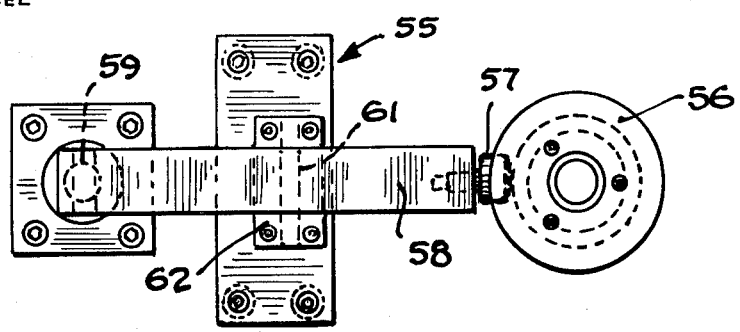

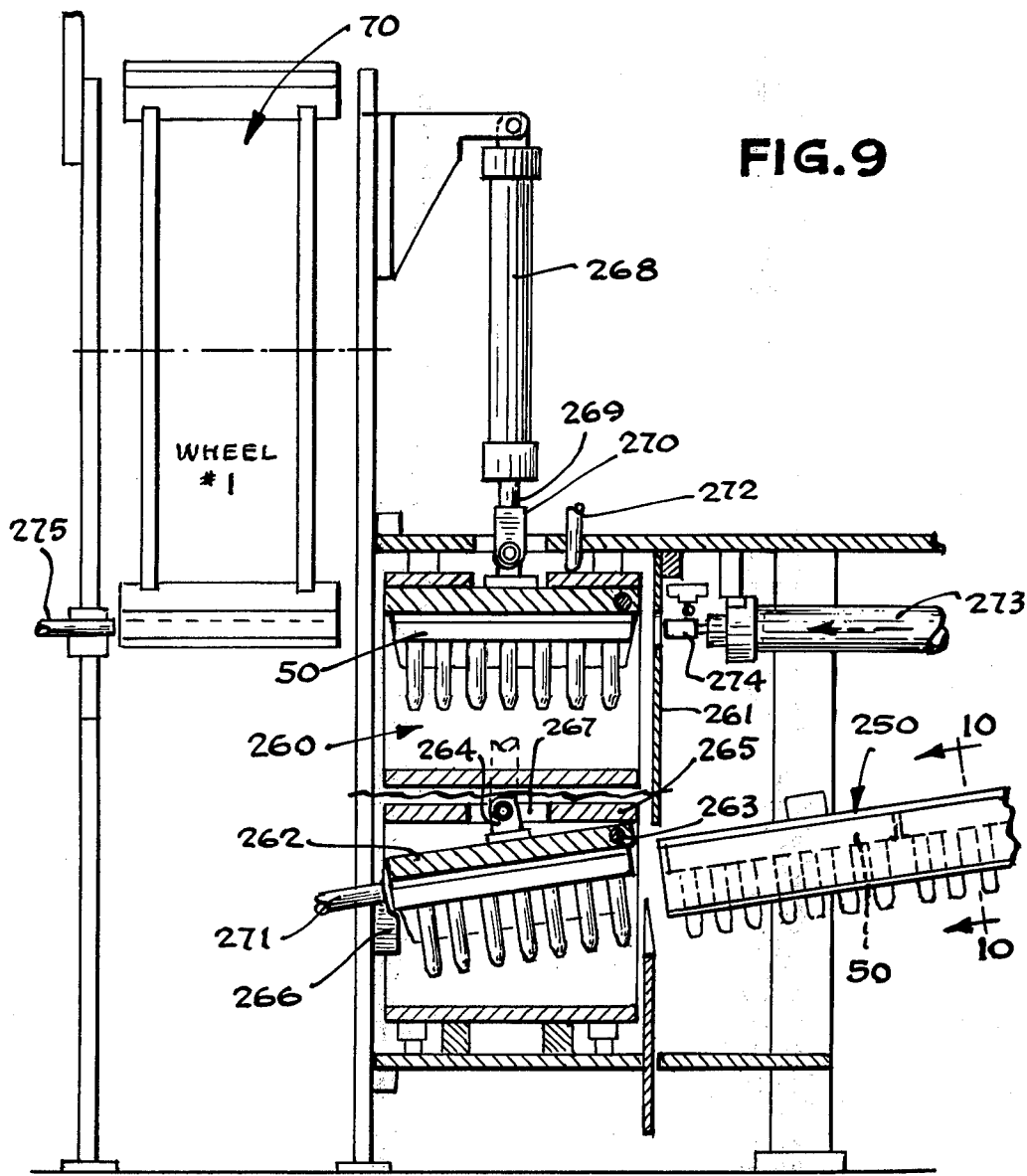
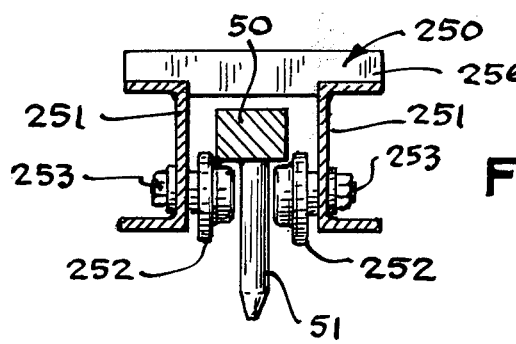

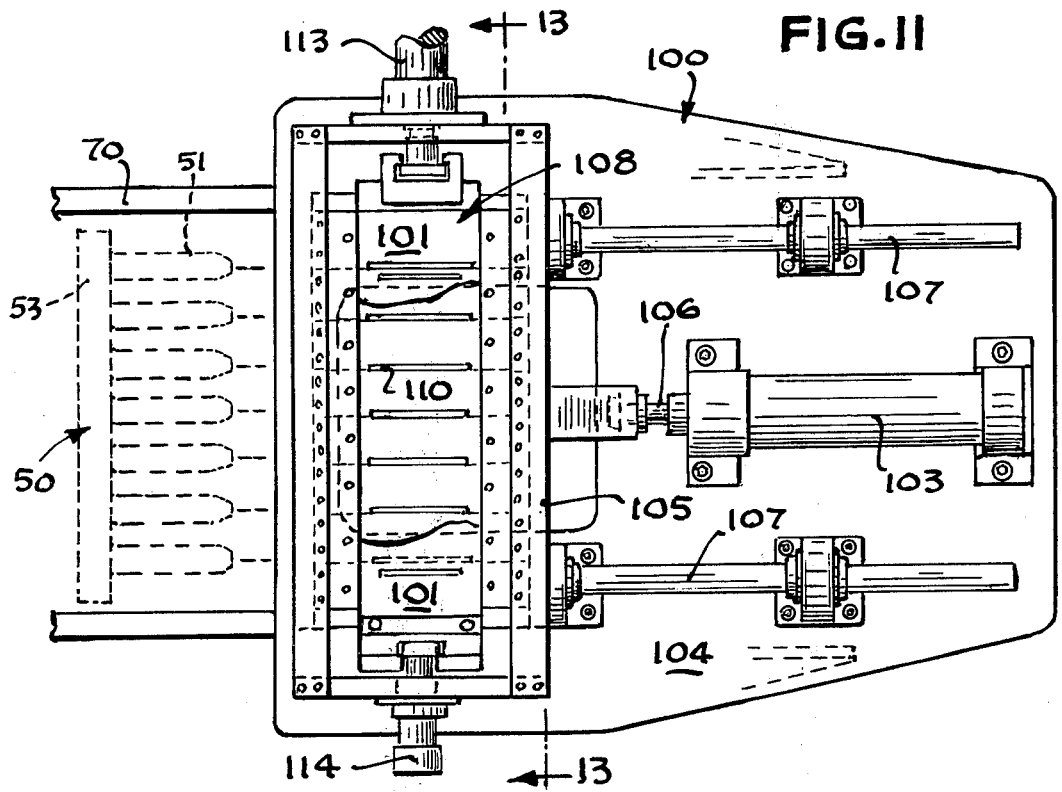
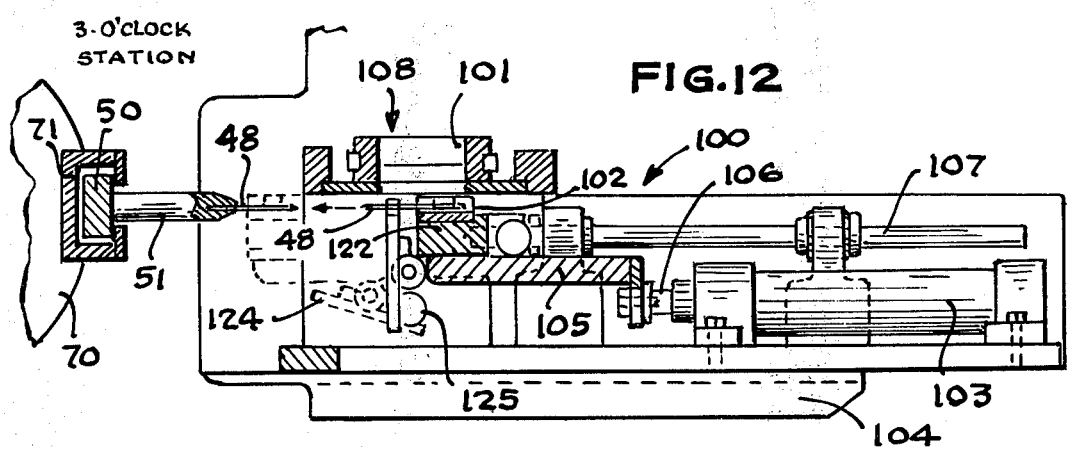
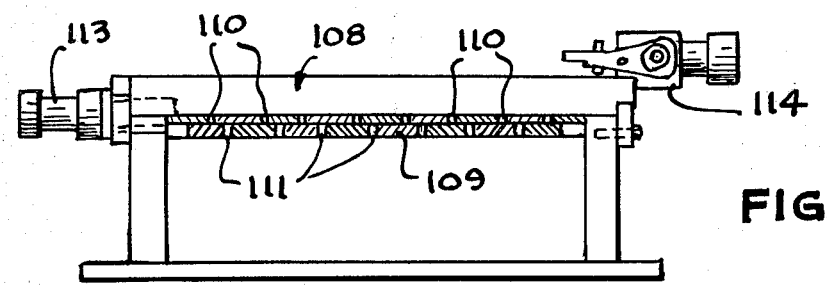

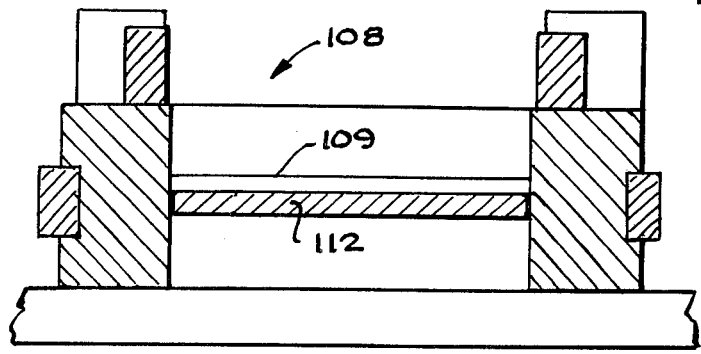
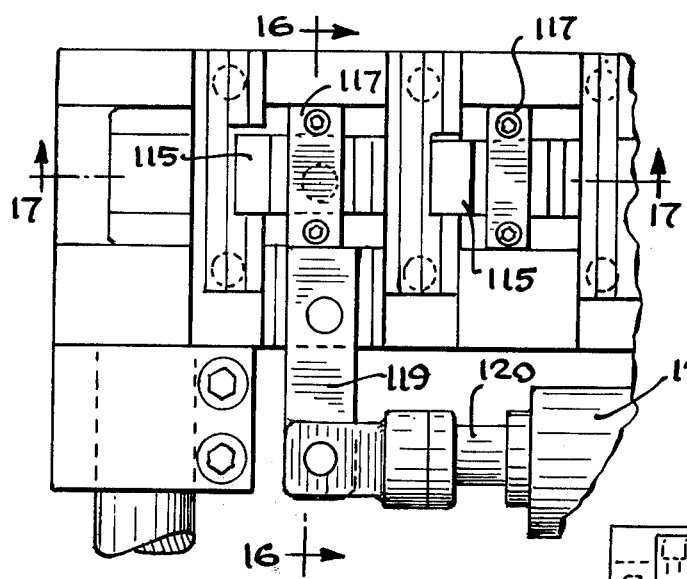
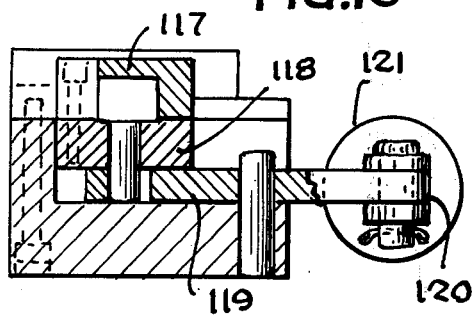
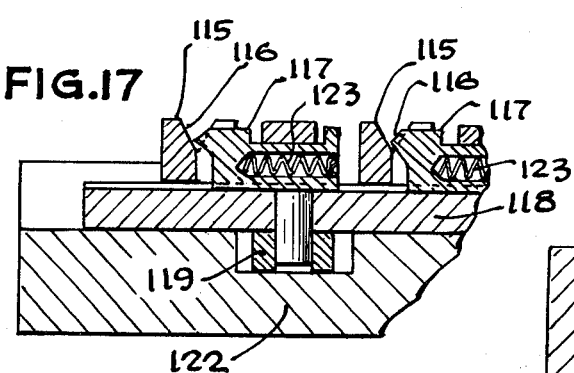
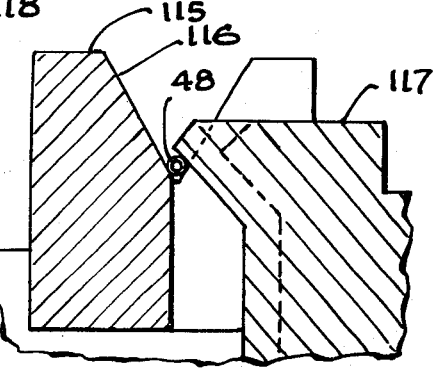

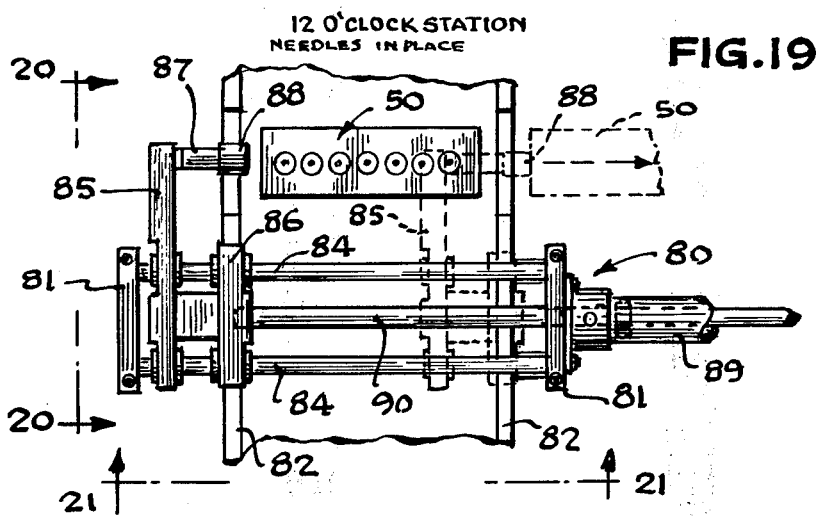
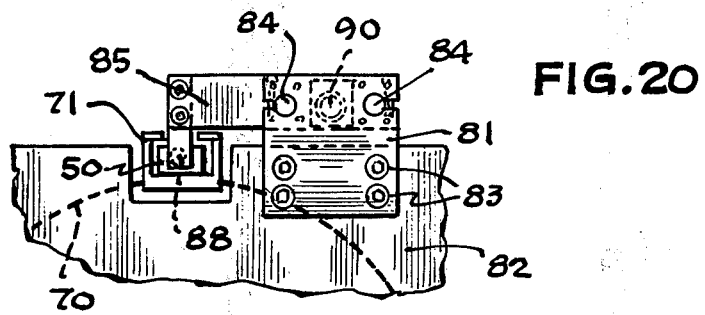
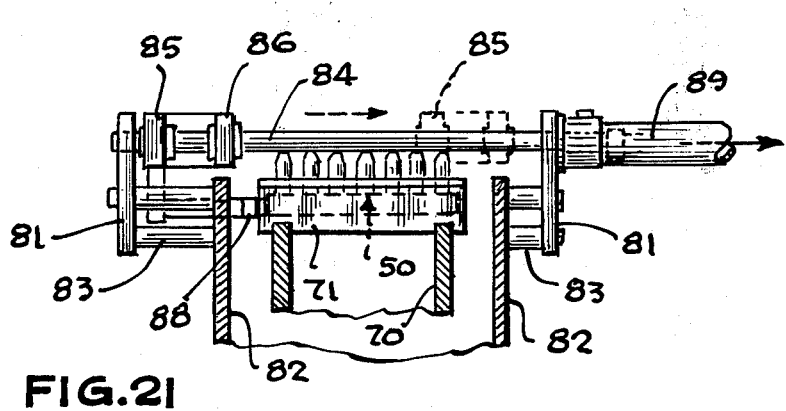

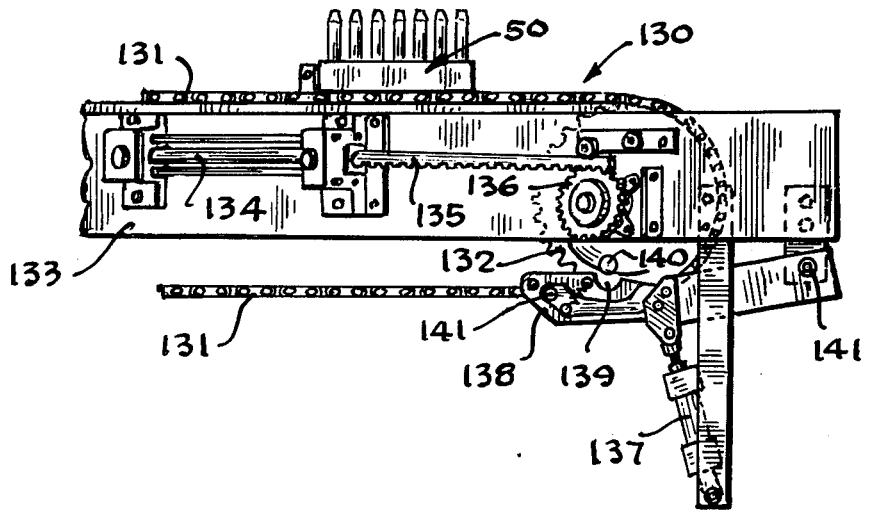
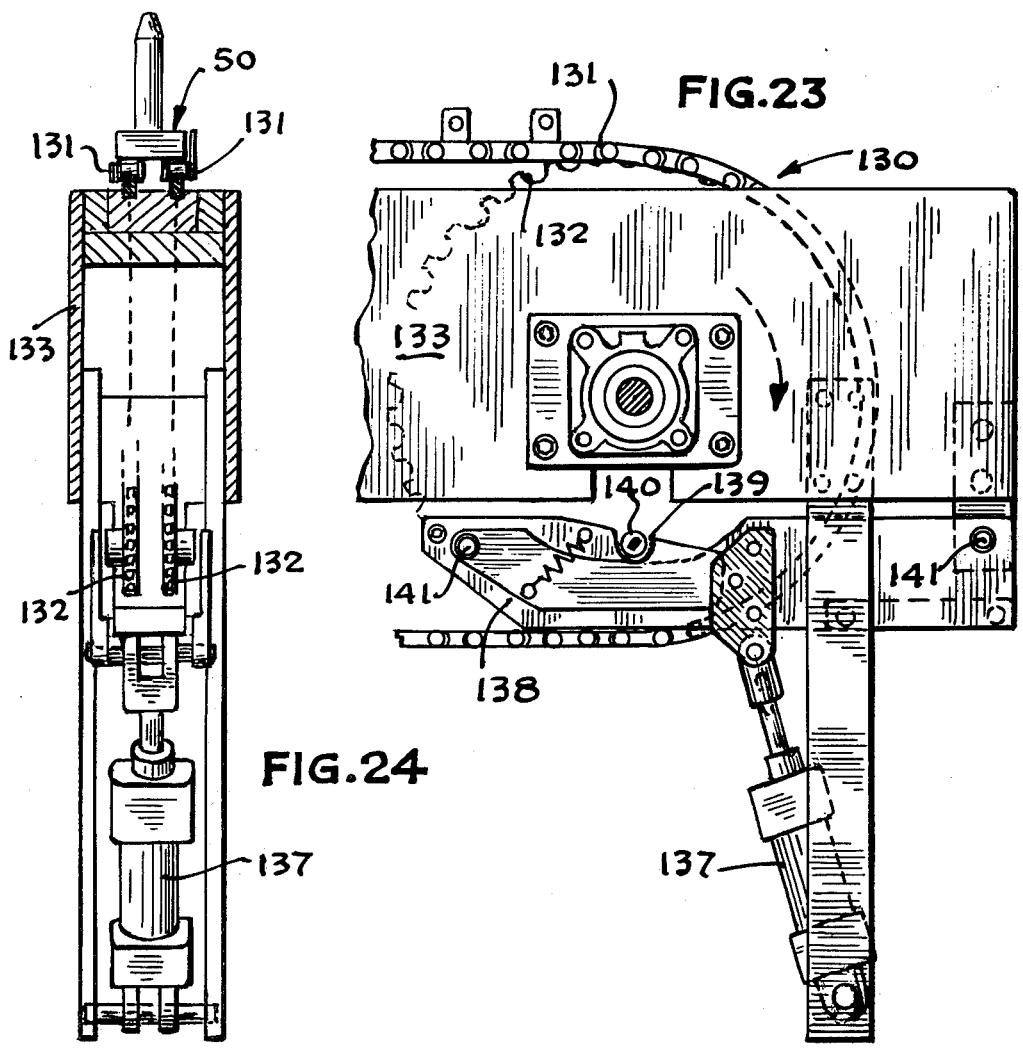
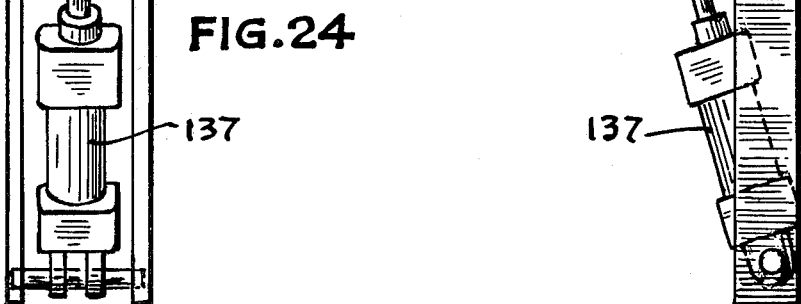

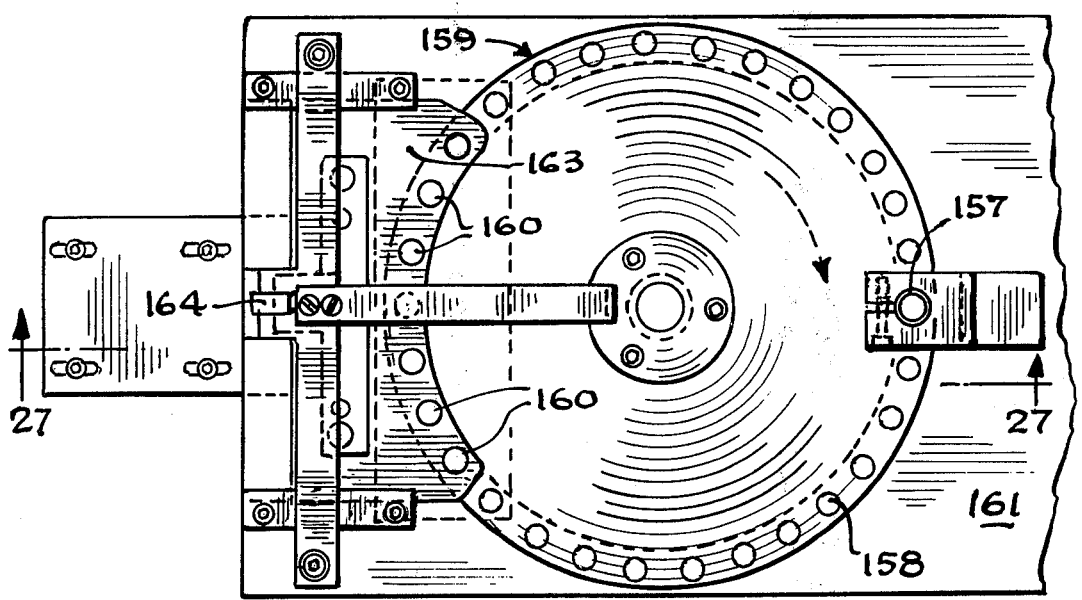
FIG. 25
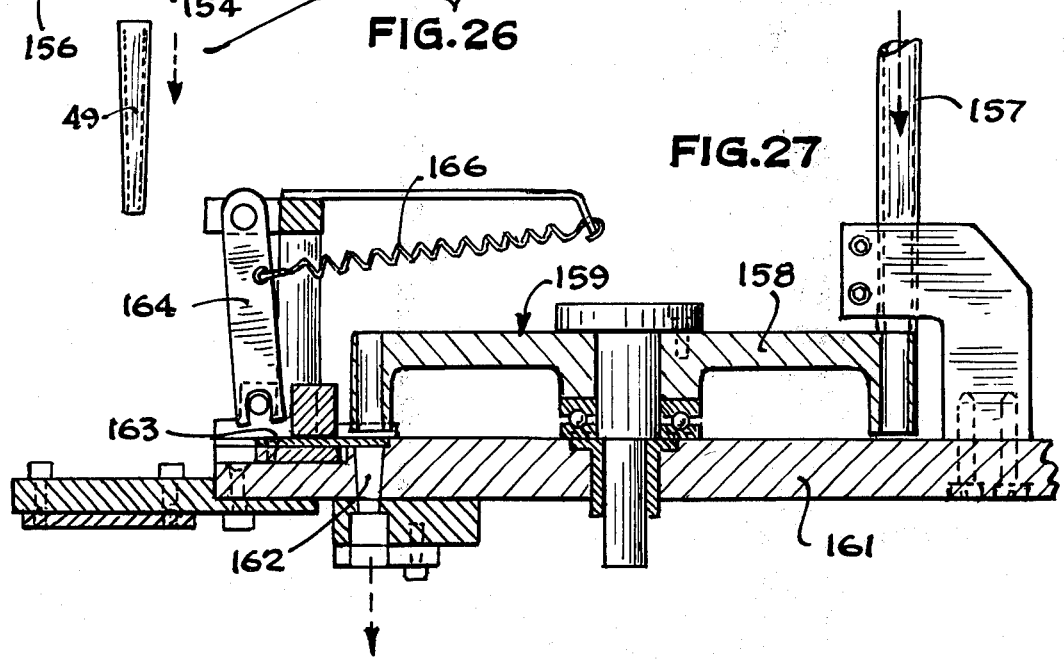
FIG. 26
FIG. 27

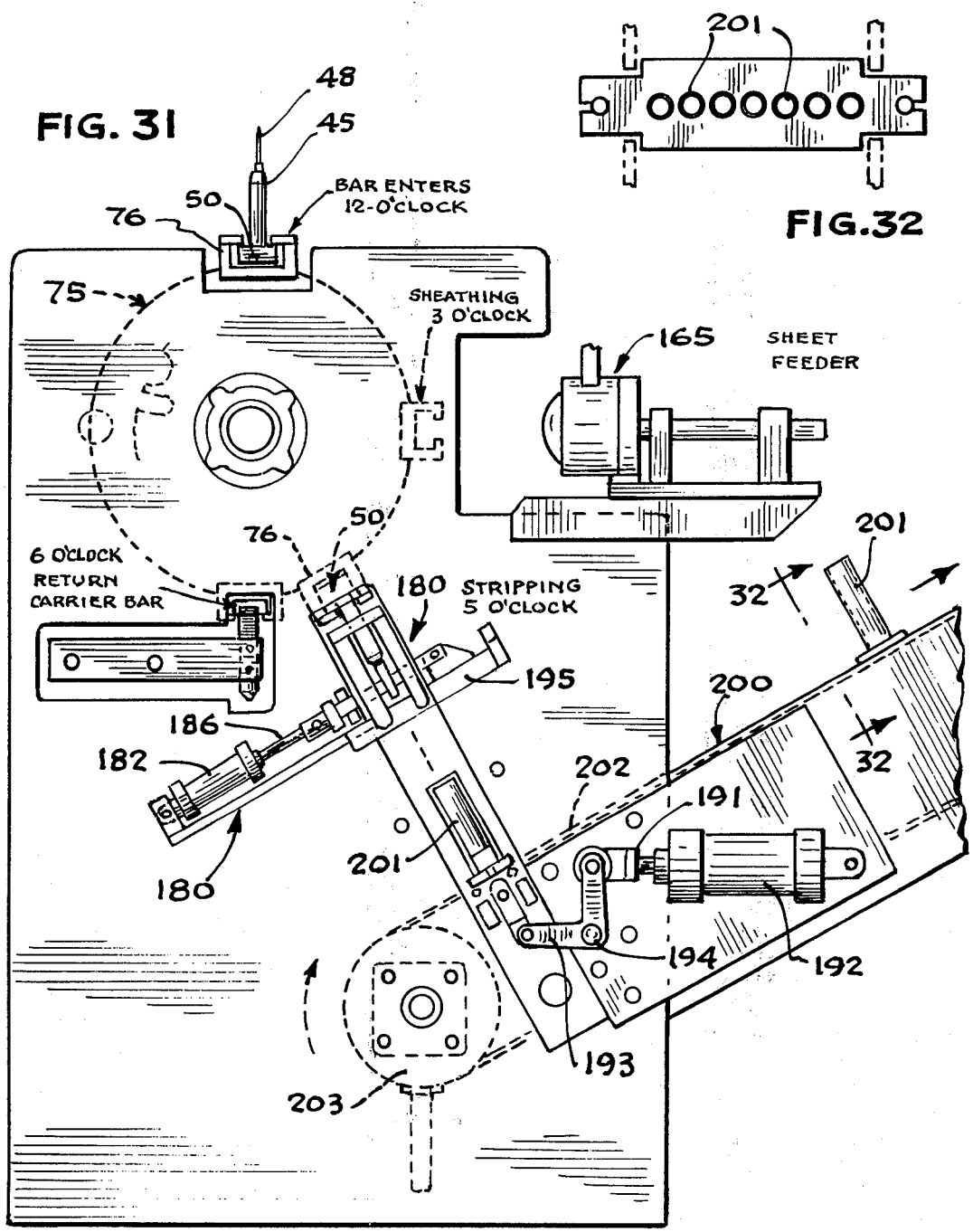

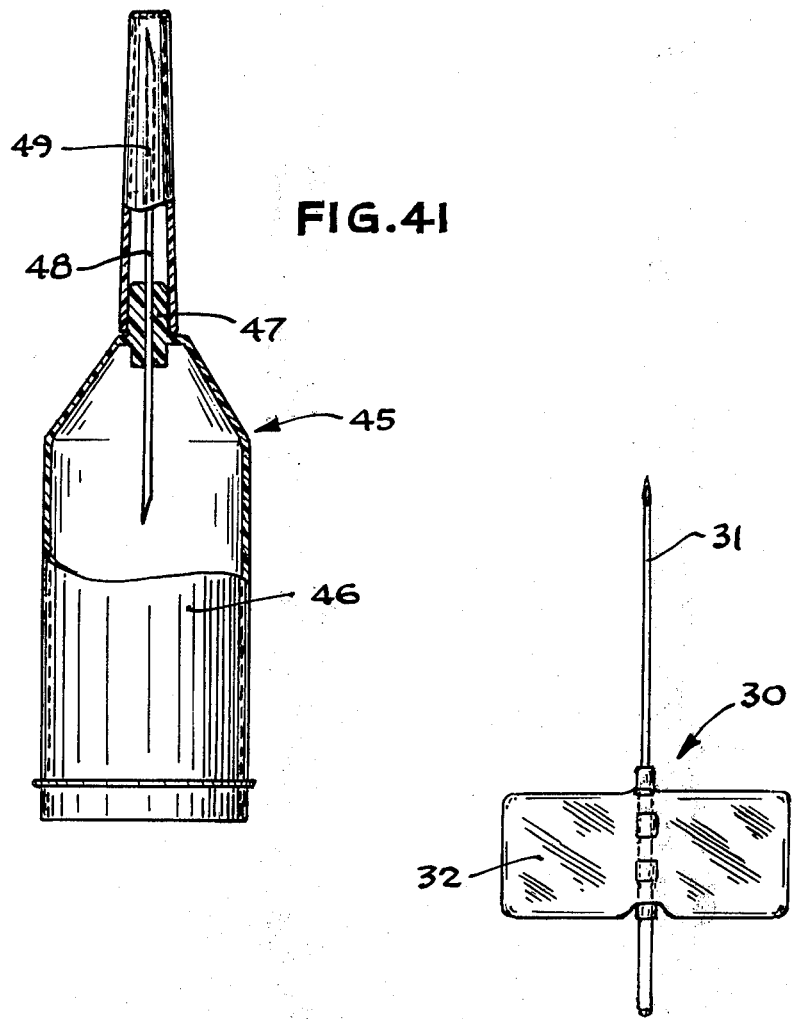

CONTINUOUS AUTOMATED PLASTIC INJECTION MOLDING APPARATUS FOR MAKING SYRINGES HAVING A COVERING SHEATH

This is a division of application Ser. No. 241,934 filed Apr. 7, 1972.

BACKGROUND OF THE INVENTION

It is desirable in the molding of plastic parts to produce such parts at a high production level. One method of obtaining a high production rate is to employ a molding machine with a plurality of cooperating or mating mold parts. As described in U.S. Pat. No. 3,309,739 for a plastic injection molding machine, the molds can be mounted on a shuttle table so that one set of mold parts are closed and the mold cavity therein injected with plastic to form the desired part while one or more other sets of molds are available for cooling, removal of finished parts and loading into the mold cavity of any special part or insert. The shuttle table is then moved to align the mold with an injection station in the molding machine while the mold which has just been injected with plastic is moved to an ejecting station. Each mold may contain a plurality of cavities so that with each injection of plastic, a plurality of parts are formed. While such a method and apparatus is generally satisfactory, to further increase the production level, additional machines are required which in turn require additional operators.

SUMMARY OF THE INVENTION

In essence, the method of the present invention and the apparatus for conducting the method comprises a pair of rotatable, indexable trunnion transfer units or wheels which may be indexed to a number of stations at which various activities take place. A carrier bar having positioned thereon a plurality of cores, for example, is positioned on the first wheel at the bottom thereof. The wheel is then indexed to a first station where inserts are fed into the cores after which the wheel is indexed to a second station at the top of the wheel where the carrier bar is transferred from the wheel to a conveyor. The conveyor transports the carrier bar to the mold where molding of the plastic part takes place. After the molding cycle is completed, the carrier bar with the molded parts thereon is transported by the conveyor to the top of the second wheel and transferred from the conveyor to the wheel. The second trunnion transfer unit or wheel is then indexed to a first station where additional parts can be added to the molded part and again indexed to a second position where the molded parts are removed from the core and deposited on a conveyor for further processing or into a storage container. The second wheel is finally indexed to a fourth position so that the empty carrier bar is positioned at the bottom of the wheel in an inverted position. The bar is then transferred to an inclined track down which it slides to the first wheel wherein the process is repeated.

The carrier bar can be designed to transport either cores or inserts depending on the part to be made.

DRAWINGS

The invention will be better understood upon consideration of the following detailed description of a specific embodiment thereof, when read in conjunction with the appended drawings, in which:

FIG. 1 is a perspective view of the molding apparatus of the present invention;

FIG. 2 is a perspective view of a carrier with mold cores projecting therefrom, the carrier being transported through the apparatus for molding and fabrication of a plastic part;

FIG. 3 is a side elevational view in cross-section illustrating a syringe barrel made with the method and apparatus of the present invention;

FIG. 6 is a side elevational view of the first trunnion transfer unit or wheel, partly in cross-section, and illustrating the position needle feeding station in relation to the trunnion transfer unit;

FIG. 7 is a top elevational view of a shot-pin assembly used to accurately align the trunnion transfer units;

FIG. 8 is a side elevational view of the shot pin assembly of FIG. 7;

FIG. 9 is a side elevational view of the return track and elevator assembly for returning a carrier from the second trunnion transfer unit to the first trunnion transfer unit;

FIG. 10 is a side elevational view in cross-section of the return track assembly with a carrier thereon;

FIG. 11 is a top plan view of the needle feeding and loading assembly, illustrating the needle feeding, clamping, and loading assemblies;

FIG. 12 is a side elevational view, partially in cross-section of the needle feeding, clamping, and loading assemblies;

FIG. 13 is a rear elevational view, partially in cross-section of the needle hopper and shuttle, taken along the line 13—13 of FIG. 11;

FIG. 14 is a side elevational view in cross-section of the needle hopper and shuttle assembly;

FIG. 15 is a partial top elevational view illustrating the needle clamping and releasing assembly;

FIG. 16 is a side elevational view in cross-section taken along the line 16—16 of FIG. 15;

FIG. 17 is a side elevational view in cross-section taken along the line 17—17 of FIG. 15 and illustrating the needle clamp assembly;

FIG. 18 is a side elevational view in cross-section illustrating the needle clamp detail;

FIG. 19 is a top elevational view of the carrier ejector assembly as positioned on the first trunnion transfer unit;

FIG. 20 is a front elevational view of the carrier ejector assembly taken along the line 20—20 of FIG. 19;

FIG. 21 is a side elevational view of the carrier ejector assembly of FIG. 19;

FIG. 22 is a partial side elevational view illustrating the chain driving and stopping mechanism;

FIG. 23 is a partial side elevational view illustrating the chain stopping mechanism detail;

FIG. 24 is a front elevational view of the chain stopping mechanism of FIG. 23;

FIG. 25 is a top elevational view of the sheath pick-up drum;

FIG. 26 is a top elevational view illustrating the sheath orienting slot in the orientation escapement and illustrating orientation of the sheaths prior to transfer to the sheath pick-up drum;

FIG. 27 is a side elevational view taken along the line 27—27 of FIG. 25;

FIG. 31 is a side elevational view of the second trunnion transfer unit illustrating the position of the sheath feeding, unloading and carrier ejection stations in relation to the trunnion transfer unit and illustrating a portion of the part transport tubes and conveyor;

FIG. 32 is a top elevational view of the transport tubes positioned on the conveyor for transporting the molded parts;

FIG. 41 is a side elevational view, partially in cross-section, of a part in which the carrier employed in the method and apparatus of this invention has cores projecting therefrom;

FIG. 42 is a top elevational view of a molded part made by the method and apparatus of this invention and in which the carrier transports the insert;

GENERAL DESCRIPTION

Figure 4:
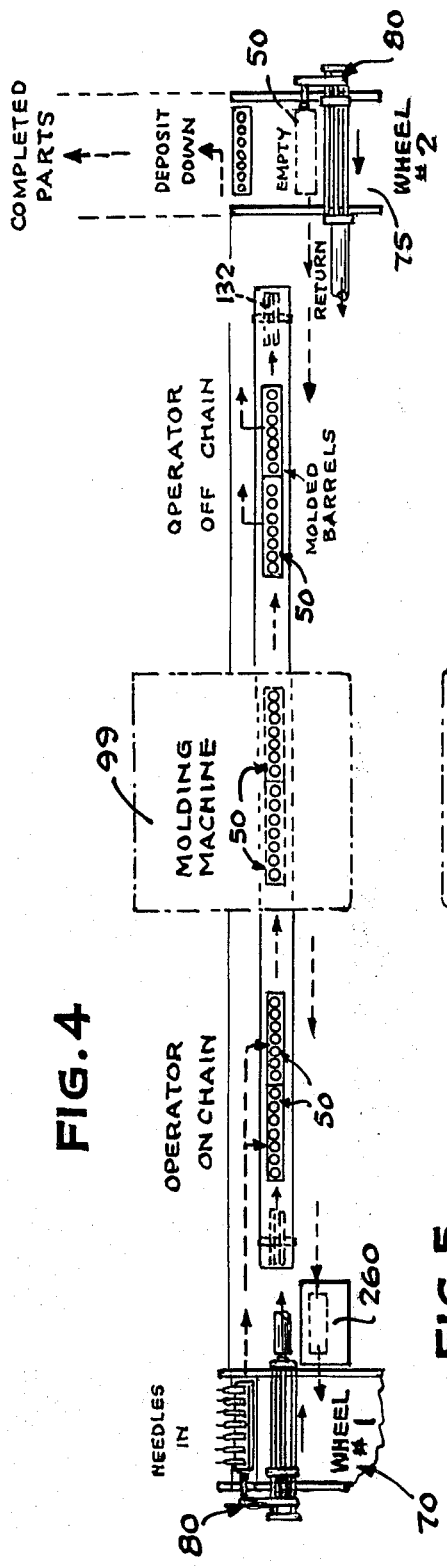
FIG. 4 is a top plan view of the apparatus illustrating the position of the various portions thereof.

The method and apparatus 40 of this invention can be employed to produce plastic parts of various types. Depending upon the part to be molded, a carrier bar 50 which is transported through the apparatus 40 as hereinafter described can be designed to transfer either cores or inserts thereon as required by the part to be formed. To produce a part 45 such as illustrated in FIG. 3, the carrier 50 can be designed to transport mold cores 51 and inserts 48 for the part. Thus, the parts 45 are molded about the core 51 and the insert 48. On the other hand, the carrier 50 can be designed to transport the insert 31 only when a part 30 such as illustrated in FIG. 42 is to be molded. For such a part 30, the carrier 50 transports the insert 31 to the mold where the plastic material 32 is injected about the insert 31. The apparatus of the present invention is portable and can be utilized with a conventional molding machine 99 such as a Hydraulic Press Manufacturing Company molding machine having a 14 ounce capacity and a 200 ton clamp.

A general understanding of the method and apparatus 40 can be attained by reference to FIGS. 1, 2, 4, and 5 which illustrate the over-all apparatus. While the method and apparatus 40 can be utilized to fabricate a variety of plastic parts, for convenience the system will be described with reference to the production of the injector or barrel portion 40 of a syringe 45 as illustrated in FIG. 3. The syringe 45 comprises a barrel 46 including a hub 47 which is molded about a cannula or needle 48. A sheath 49 is inserted onto the hub 47 of the barrel 46 to protect the needle 48 prior to use. The carrier 50 is accordingly designed for production of the injector 45 and includes a plurality of cores 51 shaped to conform with the barrel 46 and hub portion 47 of the injector 45 and projecting from the base 53 of the carrier 50. A cylindrical opening 52 in the cores 51 receives and supports the needle 48 prior to molding.

As best seen in FIG. 1, the apparatus comprises a first trunnion transfer unit 70 positioned on one side of the molding machine 99 and a second trunnion transfer unit 75 positioned on the opposite side of the molding machine 99. A movable chain assembly 130 transports the carrier 50 from the first trunnion transfer unit 70 through the molding machine 99 where the part is molded to the second trunnion transfer unit 75 where additional parts such as the sheath 49 can be added and the part stripped from the cores 51 on the carrier 50. The empty carrier 50 is then conveyed from the second trunnion transfer unit 75 by means of a return track assembly 250 to an elevator assembly 260 which transfers the carrier 50 to the first trunnion transfer unit 70 where the process is repeated.

To produce the injector 45, a suitable carrier 50 having cores 51 thereon as previously described is inserted at the six o'clock position of the first trunnion transfer unit 70. The trunnion 70 is then rotated to the three o'clock position where a needle feeding assembly 100 inserts needles 48 into the opening 52 of the cores 51. The trunnion 70 is then rotated to the 12 o'clock position where the carrier 50 is ejected onto the chain assembly 130. The carrier 50 with the loaded needles 48 in the cores 51 is then conveyed to the molding machine 99 where the mold is closed about the cores 51 and the plastic injected. The mold is then opened and the carrier 50 with the molded parts 45 thereon is conveyed to the second trunnion transfer unit 75 where the carrier 50 is loaded onto the transfer unit 75 at the 12 o'clock position thereof. The transfer unit 75 is further rotated in a clockwise direction to the three o'clock position where sheaths 49 are inserted onto the hub 47 of the injector 45. The sheaths 49 which are previously molded are stored in a hopper 150 and are fed to an orientation excapement 151. Here the sheaths 49 are oriented into a proper position as hereinafter explained and fed to a sheath feeder assembly 165 which loads the sheaths 49 onto the barrel 46 of the injector 45. The transfer unit 75 is then rotated to the five o'clock position where the molded parts 45 are stripped from the cores 51 of the carrier 50. The parts 45 can then be conveyed to other equipment for further processing or may be collected in suitable containers. The transfer unit 75 is subsequently rotated to the six o'clock position where the carrier 50 in an inverted position is ejected onto the return track assembly 250 and is conveyed to the elevator 260. The carrier 50 is then inserted into the first trunnion transfer unit 70 and the process is repeated.

The trunnion transfer wheels 70, 75 are indexed by means of a 12-stop Geneva-drive. Geneva drives are conventionally utilized for indexing purposes and are described in Mechanisms and Dynamics of Machinery, 2nd Edition by Mabie and Ocvirk at pages 32 and 33. Referring to FIGS. 6, 7, and 8, FIG. 6 illustrates the first trunnion transfer wheel 70. Transfer wheel 70 includes 12 spaced cradles 71 positioned evenly around the periphery of the trunnion transfer unit 70 which receive and support the carrier 50 as they are transported by the wheel 70 to the various positions. In the operation of the apparatus, the trunnion transfer units 70, 75 are advanced with an intermittent rotary motion, the distance of each interval of advance being such as to move each cradle 71, 76 into the position previously occupied by the one immediately ahead of it. This intermittent advance of the trunnion transfer units 70, 75 is effected by a Geneva-drive and clutch and brake combination (not shown). In the embodiment illustrated, the trunnion transfer units 70, 75 are indexed by using a 12-stop Geneva-drive being driven by a reducer and electric clutch-brake. The Geneva-drive is coupled to an electric motor by a clutch, the output from the clutch driving a gear-reducer through a brake. By a simultaneous releasing of the clutch and engaging of the brake, transmission may be effectively instanteously stopped. The output from the gear-reducer drives a Geneva-drive input gear which has a driving pin projecting from its outer edge. The Geneva-drive results from the meshing of the pin with corresponding slots in a Geneva-drive output gear. While the input gear rotates uniformly and at a constant speed, power is transmitted to the Geneva-drive output gear intermittently because the pin moves inwardly and outwardly in the slots for part of its travel and is then ineffectual to rotate the gear. The intermittent drive is transmitted to the trunnion transfer unit 70, 75. FIGS. 7 and 8 illustrate a shot-pin assembly 55 which accurately lines up the trunnion transfer units 70, 75 at the various positions. On a signal produced, for example, after the needles 48 are fed into the cores 51, as hereinafter explained, a latching relay holds the contacts of the motor control relay closed. A lobe on the shot-pin cam 56 (FIG. 7) energizes another relay which in turn breaks the connection to the motor drive and the wheel 70, 75 is stopped as the brake is released. While the Geneva-drive clutch and brake combination stops the transfer wheel 70, 75 at the desired position, a shot-pin assembly 55 is utilized to accurately align the wheel at the proper position. The shot-pin assembly 55 basically comprises a cam 56, a cam follower 57, arm 58 and shot-pin 59. Each station on the trunnion transfer unit 70, 75, corresponding to the position of a cradle 71, 76 includes a bushing (not shown) for engagement with the pin 59. The pin 59 is tapered and as the wheel 70, 75 stops at each station, the pin 59, activated by the cam 56, follower 57, and arm 58 enters a bushing and accurately lines up the wheel. The shot-pin assembly 55 is supported by a plate 60 positioned adjacent the trunnion transfer units 70, 75, the arm 58 thereof pivoted in the center on a pin 61 at the end of a bracket 62 extending from the support plat 60. Likewise, the shot-pin 59 is pivoted to the arm 58 on the side opposite the cam follower 57 by pivot pins 63 on the end thereof and on the arm 58, the pins 63 connected by a link 64. The shot-pin 59 reciprocates through bushing 65 which passes through the plate 60; a spring 66 acting to assist the insertion of the shot-pin 59 in the trunnion transfer units. Each wheel is driven separately by its own drive and signals.

RETURN TRACK AND ELEVATOR ASSEMBLY

Figure 5:
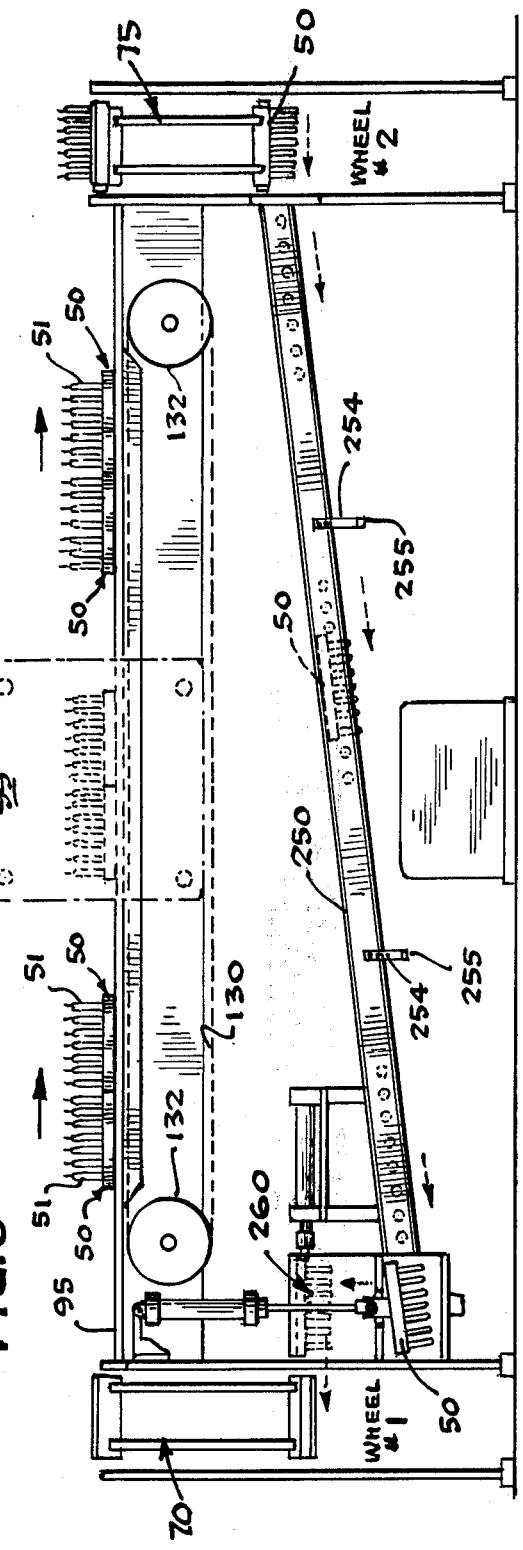
FIG. 5 is a side plan view of the apparatus of FIG. 4 illustrating the position of the various portions thereof and the transport of the carrier through the apparatus during the molding of a part.

After the molding process is completed and the parts are unloaded from the carrier 50 as hereinafter explained, the carrier 50 is ejected from the second transfer unit 75 onto the return track 250 in an inverted position. Referring to FIGS. 5, 9, and 10, the return track 250 lies in an inclined position and connects the bottom or 12 o'clock position of the second trunnion transfer units 75 with the elevator assembly 260 and comprises a pair of spaced channel beams 251 affixed to frame member 256. Opposed rollers 252 are affixed to the channel beams 251 along the length thereof by means of bolts 253 and permit the carriers 50 to slide along the length of the return track 250, the base 53 being supported by the rollers 252 and the cores 51 depending through the space between the opposed rollers 252. Accordingly, the carriers 50 are transported from the second trunnion transfer unit 75 along the return track 250 to the elevator assembly 260. To provide additional support for the return track 250, tie bars 255 are positioned at intervals along the length thereof, affixed to a pair of opposed depending brackets 254, the other ends of which are fastened to the channel beams 251. The elevator assembly 260 comprises a support frame 261 which receives the carriers 50. The carrier transfer member 262 is normaly in an inclined position in line with the return track 250 and depends by means of pivot 263 from a horizontal plate 265 and is supported on the opposite end by a shoulder 266 affixed to and projecting from the support frame 261. A bracket 264 projects from the transfer member 262 through an opening 267 in the plate 265. The bracket 264 is gripped for transfer of the entire assembly as hereinafter explained. As the carrier 50 arrives at the carrier transfer assembly 262 in the elevator 250, it activates a switch 271. The switch 271 in turn activates an air cylinder 268 which includes a reciprocating plunger 269 and a gripping head 270. The head 270 of the air cylinder 268 engages with the bracket 264 of the carrier transfer assembly 262 and the cylinder 268 reverses direction to transport the transfer assembly 262 and carrier 60 in a vertical direction. The transfer assembly 262 is first pivoted into a horizontal position and then transferred to the top of elevator assembly 250, in line with the cradle 71 at the six o'clock position of the first trunnion transfer unit 70, where a switch 262 is engaged. The switch 262 activates the air cylinder 263 and the head 264 thereof pushes the carrier 50 onto the first trunnion transfer unit 70 at the six o'clock position thereof.

NEEDLE FEEDING AND LOADING

After the carrier is loaded onto the first trunnion transfer wheel 70 at the six o'clock position thereof, the wheel 70 is rotated in a counterclockwise direction, as previously described, to the three o'clock position to a needle feeding station. With a needle 48 having a point on either end, care must be exercised so that the points are not damaged. Accordingly, the needles 48 cannot be dropped or pushed into the openings 52 in the cores 51. A clamp assembly 102 is therefore used to feed the needles 48 into the cores 51. The needle feeding and loading assembly 100 basically comprises a hopper and feeding assembly 101 for feeding the needles 48 to a clamp assembly 102 and an air cylinder 103 for transferring the needles 48 from the clamp assembly 102 to the cores 51. The entire needle feeding and loading assembly 100 is mounted on a stationary plate 104, the clamp assembly 102 being mounted on a base plate 105 attached to the piston 106 of the air cylinder 103 and slidable on a pair of guide rods 107 so that the clamping assembly 102 can be moved from a feeding and clamping position to a loading position. The needle feeding assembly 101 is fully described in U.S. Pat. No. 3,631,990, issued Jan. 4, 1972 and comprises a hopper 108 and a shuttle 109 for sequentially and singly feeding needles 48 into the clamping assembly 102. A hopper 108 is positioned over each of the clamps 102, the hoppers 108 having a slot 110 at the bottom thereof for passage of the needles 48 one at a time. As illustrated in FIGS. 11 through 14, positioned beneath the hopper 108 and in engagement therewith, is a reciprocal shuttle 109 which likewise includes a slot 111 into which the needles 48 drop when the slots 110, 111 in the hopper 108 and the shuttle 109 are in alignment. After a needle 48 is retained within the slot 111 of the shuttle 109, the shuttle 109 is moved transversely. In engagement with the bottom surface of the shuttle 109 is a fixed block 112 having a slot which is in alignment with the needle clamp 102 in the clamping assembly. When the slot 111 in the shuttle 109 which contains a needle 48 picked up as previously described is in alignment with the slot in the fixed block 112, the needle 48 will drop into position in the slot for individual loading into the clamp 102. The shuttle 109 of course includes a plurality of slots 111, one for each hopper 108 and clamp 102. A conventional air operated cylinder 113 can be employed to reciprocate the shuttle 109 transversely to transfer needles 48 from the slot 110 in the hopper 108 to the slot in the fixed block 112 (FIG. 14) preparatory to loading them in the clamp 102. Likewise a suitable vibration inducer 114 for the hopper is a ball vibrator in which a steel ball is propelled by compressed air around hardened steel braces at high speed setting high frequency vibrations in all directions.

Referring to FIGS. 17 and 18, the needle clamp 102 comprises a block 115 having a V-shaped slot 116 therein which receives a needle 48 in accurate alignment with the openings 52 in the core 51, and a reciprocating jaw 117 for holding the needle 48 in position while loading into the core 51. The jaws 117 are mounted on a slidable plate 118 which in turn by means of an arm 119 is attached to the piston 120 of an air cylinder 121, as illustrated in FIGS. 15, 16 and 17. The lever arm, being pivotally mounted on the block or plate 122, will move the jaws 117 out of engagement with the needle 48 as the piston 120 of the cylinder 121 is activated, as best seen in FIG. 15. The jaws 117 are each guided by the plate 118 and rest in a slot therein so that they can move individually, and are biased toward the V-shaped slot 116 in the needle receiving block 115 by a spring 123, as illustrated in FIG. 17. The jaw guiding plate 118, activated by the air cylinder 121, as previously described, moves all of the jaws 117 away from the needle receiving block 115 simultaneously to release the needles 48 after they are inserted in the openings 52 in the cores 51. Accordingly, the air cylinder 121 is employed only to hold the jaws 117 open for feeding and releasing of the needles 48; the springs 123 acting to close the jaws 117 when the air cylinder 121 is released.

As the needles are dropped from the feeding assembly 101 into the clamps 102 as previously described, to prevent needles 48 from accidentally falling from the clamps 102 prior to activation of the jaws 117, a guide plate 124 is employed to support one end of the needle 48. When the needles 48 are all loaded into the clamps 102, the cylinder 103 is activated to push the entire clamping assembly 102, which is mounted on a base plate 105 which is reciprocal between a needle feeding and needle loading position, toward the carrier 50 whereupon the needles 48 are inserted into the cores 51, as best illustrated in FIGS. 11 and 12. As the assembly 102 advances, the guide plate 124 is pushed out of the way by the plate 105 as it rides on the roller 125 affixed to the guide bar 124. (see FIG. 12) The air cylinder 121 controlling the jaws 117 is activated after the needles 48 are loaded into the cores 51 to release the needles 48, as previously described, and the second air cylinder 103 thereupon withdraws the entire assembly 102 to the needle feeding position for feeding of needles 48 into the clamps 102.

CARRIER EJECTOR ASSEMBLY

After the cores 51 on the carrier 50 are loaded with needles 48 at the needle feeding station, the cradle 71 on the first trunnion transfer wheel 70 containing the carrier 50 is indexed to the 12 o'clock position by rotating the trunnion transfer unit 70 counterclockwise, as previously described. Here the carrier 50 is in an upright position, ready to be transferred to the mold (not shown). A carrier ejector assembly 80 is employed to eject the carrier 50 from the first trunnion transfer wheel 70 at the 12 o'clock position thereof onto the conveyor chain 130 and a similar assembly 80 is utilized to eject the empty carrier 50 from the second trunnion transfer wheel 75 at the six o'clock position thereof onto the return track for returning of the carrier 50 to the first trunnion transfer unit 70. The ejector assembly 80 for unloading the carrier 50 from the first trunnion transfer wheel 70 is positioned at the top of the transfer wheel 70 as best illustrated in FIGS. 19, 20 and 21. The ejector assembly 80 is greater is width than that of the transfer wheels 70, 75 so as not to interfere with their movement and comprises a pair of opposed end plates 81 fastened to a support frame 82 by belts 83 and a pair of guide rods 84 on which slides the ejector head 85 and connecting member 86. Projecting laterally from the ejector head 85 is an arm 87 from which in turn a bumper 88 of plastic or rubber projects toward the wheel 70, 75 for contact with the carrier 50 as the ejector assembly 80 is activated to eject the carrier 50 from the wheel 70, 75.

An air cylinder 89 is fastened to the opposite end plate 81, the piston 90 thereof being connected to the connecting member 86 and the ejector head 85. When the air cylinder 89 is activated, the piston 90 thereof draws the ejector head 85 toward the cylinder 89, the bumper 88 contacting the carrier 50 and ejecting it from the cradle 71 76 in the trunnion transfer unit 70, 75. In the embodiment illustrated, the ejector assembly 80 unloads the carrier 50 from the first trunnion transfer wheel 70 onto a shelf or table where an operator positions it on the chain 130 for transport to the mold 99. If desired, the carrier 50 can be ejected directly onto a conveyor.

CARRIER TRANSPORT CONVEYOR

After loading of the needles 48 into the cores 51 on the carrier 50 at the needle feeding station and unloading of the carrier 50 from the first trunnion transfer wheel 70, the carriers 50 are transported from the first trunnion transfer wheel 70 to the mold 99 and thence to a second trunnion transfer wheel 75 by an endless chain conveyor 130. In the embodiment illustrated, the chain 131 revolves around a pair of opposed sprockets 132 fastened to the chain support frame 133 and is utilized to convey the carrier 50. The chain 131 must position the carriers 50 in alignment within the mold 99. As illustrated, two carriers 50 are positioned in the mold 99 at the same time so that 14 syringe barrels 46 are molded during a single molding cycle. Various means can be utilized to drive and stop the chain 131, such as a clutch and brake type arrangement previously described in connection with the driving means for the trunnion transfer wheels 70, 75. As illustrated, the chain 131 is driven by an air cylinder 134 which drives a rack 135 and pinion gear 136 combination; the pinion 136 being affixed to the sprocket 132. In the embodiment illustrated, as best seen in FIG. 4, the chain is driven an equal distance from the first trunnion transfer wheel 70 to the mold 99 and from the mold 99 to the second trunnion wheel 75.

The chain driving means is best illustrated in FIGS. 22, 23 and 24. The chain revolves around a pair of opposed sprockets 132 positioned on the supported frame 133 adjacent each trunnion transfer wheel 70, 75 so that the chain 131 travels from the first trunnion transfer wheel 70 through the molding area of the molding machine 99 to the second trunnion transfer wheel 75. A pinion gear 136 is affixed to one of the sprockets 132 and is in engagement with a rack 135 driven by an air cylinder 134. The distance the chain 131 travels is selected to position the carriers 50 at the mold 99 so that the mold halves can be closed about the cores 51 on the carrier 50 prior to the injection of plastic to form the parts being molded. As best seen in FIGS. 1 and 4, the carriers 50 are ejected from the 12 o'clock position of the first trunnion transfer wheel 70 by the carrier ejector assembly 80 as previously described, onto a table or shelf 95. In the embodiment illustrated, when two loaded carriers 50 have been ejected onto the shelf 95, an operator pushes them onto the chain 131. To assist in holding the carrier 50 in position on the chain 131 while being transported, two plates (not shown) can be affixed to the chain 131 in an upright position, the distance between the plates corresponding to the length of the two carriers 50. Likewise, the carriers 50 can be ejected directly onto the chain 131 or other conveyor. When the carriers 50 are loaded on the chain 131, an air cylinder 134 in engagement with the rack 135 is activated, driving the rack 135 a predetermined distance, preselected to position the carriers 50 within the mold 99. In turn, the rack 135 drives the pinion gear 136 to revolve the sprockets 132, drive the chain 131 and position the carrier bars 50 in the mold 99. To stop the chain 131 and hold the carriers 50 in the mold 99, a second air cylinder 137 is employed to activate a hinged lever 138 with a slot 139 therein engageable with a pin 140 projecting outwardly from the sprocket 132. When the cylinder 134 and rack 135 and pinion gear 136 combination have moved the chain 131 the selected distance to position the carriers 50 in the mold 99, the second air cylinder 137 is activated to pivot the hinged lever about a pivot pins 141 thereby engaging the slot 139 in the lever 138 with the pin 139 on the sprocket 132 to stop and hold the chain 131. After the molding cycle is completed, the mold 99 is opened and the carriers 50 with the molded parts 45 thereon are transported by the chain 131 in a manner described above with reference to loading of the carriers 50 in the mold 99, to a position adjacent the 12 o'clock position of the second trunnion transfer wheel 75.

SHEATH FEEDING AND LOADING

After the carrier 50 with the molded syringe barrels 46 on the cores 51 thereof is loaded onto the 12 o'clock position of the second trunnion transfer wheel 75, as previously described, the trunnion transfer wheel 75 is indexed to a sheath feeding station at the three o'clock position of the trunnion transfer wheel 75 where the cores 51 with molded syringes 45 thereon are in a horizontal position with the needles 48 extending outwardly. Here the sheaths 49 are inserted onto the hub 47 of the syringe barrel 46. Referring to FIGS. 1, 25, 26, 27, 28, 29 and 30, orientation, feeding and insertion of the sheaths 49 onto the hub of the barrel is illustrated.

A supply of sheaths 49 is placed in the hopper 150 from where they are fed in random fashion through a feed tube 152 to an orientation escapement 151. In the orientation escapement 151 is an orientation slot 153 in a horizontal plate (not shown), as illustrated in FIG. 26, through which the sheaths 49 drop with the same side down, as illustrated hereinafter. As illustrated in FIGS. 3 and 41, the sheath 49 comprises a tubular element having a slight taper with the open end thereof being of greater diameter than the closed end, the open end fitting on the hub 47 of the syringe barrel 46. The orientation slot 153 has a configuration which would be formed by two rectangles of different widths with the same center line, the width of the wider rectangle corresponding essentially to the diameter of the sheath 49 at the open end or greater diameter, the width of the other rectangle corresponding essentially to the diameter of the sheath 49 at the closed end or smallest diameter, the length of the smaller rectangle essentially corresponding to the length of the sheath 49, the length of the wider rectangle being less than the length of the sheath 49. Accordingly, the orientation slot 153 comprises a rectangle, the length thereof being less than the length of the sheath 49 and the width substantially corresponding to the greatest diameter of the sheath 49 with smaller rectangles 156 projecting from the ends of the larger rectangle 154, the width of the smaller rectangles 156 essentially corresponding to the diameter of the closed end or smallest diameter of the sheath 49, the overall length of the orientation slot 153 essentially corresponding to the length of the sheath 49.

As can be seen in FIGS. 1 and 26, the sheaths 49 slide down a feed tube 152 from the hopper 150 and arrive at the slot 153 in the orientation escapement in random fashion. As illustrated in FIG. 26 by dotted lines, since the length of the larger diameter rectangle 154 is less than the length of the sheath 49, and since the width of the smaller projecting rectangles 156 is less than the width of the open end of the sheath 49, the wider diameter of the sheath 49 is prevented from passing through the slot 153. The smaller diameter of the sheath 49 however can pass through the smaller slot 156 and consequently will drop through the slot 156 whereupon the open end of the sheaths 49 can then pass through the larger diameter slot 154. Accordingly, the sheaths 49 will drop through the slot 153 with the smallest diameter down, regardless of which way they were facing when they arrive at the slot 153.

Figure 28:
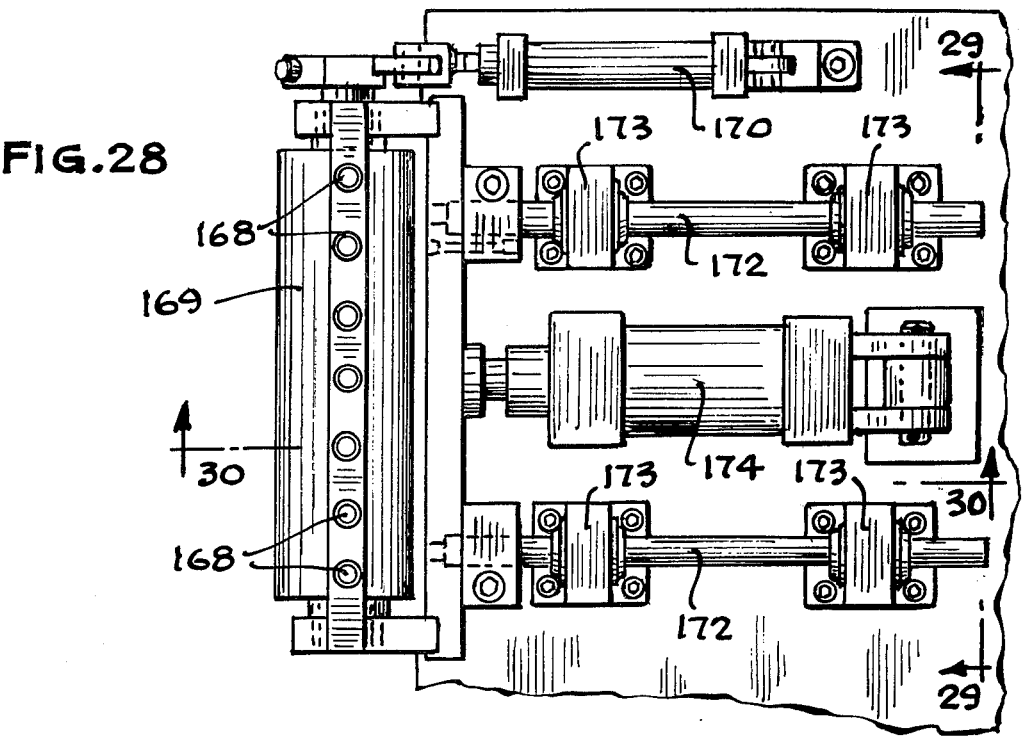
FIG. 28 is a top elevational view of the sheath loading assembly.
Figure 29:
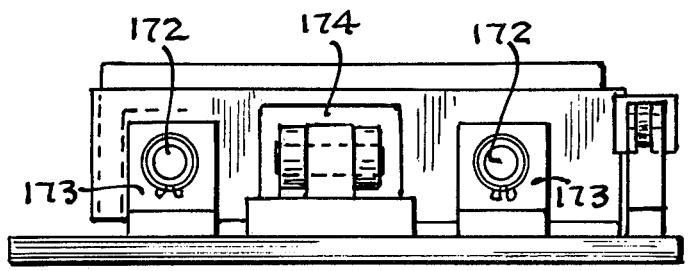
FIG. 29 is a rear elevational view of the sheath loading assembly taken along the line 29—29 of FIG. 28.
Figure 30:
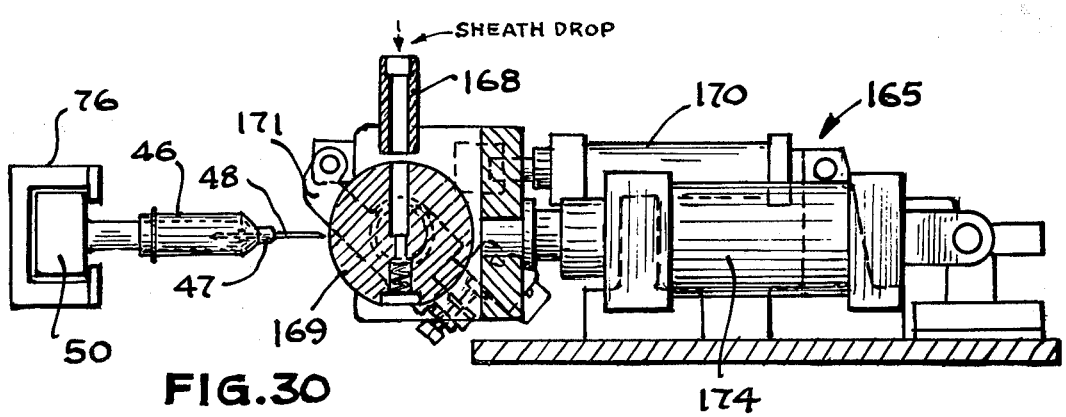
FIG. 30 is a side elevational view, partially in cross-section, of the sheath loading assembly taken along the line 30—30 of FIG. 28.

After orientation, the oriented sheaths 49 drop through a tube 157 and pass to a pick-up drum 158 which comprises a revolving table 159 with a plurality of holes 160 on the periphery thereof to receive the sheaths 49. The drum 158 revolves on a plate 161 which has seven drop-out holes 162 therein which are in alignment with the holes 160 on the pick-up drum 158. As the drum 158 revolves, it picks up a series of oriented sheaths 49 through the tube 157 and transports them to the other side of the plate 161 to the drop-out holes 162 on the plate 161. The number of drop-out holes 162 in the plate 161 is selected to correspond to the number of cores 51 on the carrier 50 so that an equivalent number of sheaths 49 can be fed as hereinafter explained. Access of the sheaths 50 to the drop-out holes 162 is controlled by a cover plate 163 held closed by a lever 164 biased by a spring 166 and opened by a solenoid (not shown). As the solenoid is activated, the cover 163 is drawn back and the oriented sheaths 49 drop from the pick-up drum 158 to the sheath feeding station through the drop-out holes 162. Since the sheaths 49, when in the holes 160 in the pick-up drum 158 are in a curved alignment, they must be transferred to linear alignment in the sheath feeder 165 for insertion on the syringe barrels 46. This is accomplished by dropping the sheaths 49 from the pick-up drum 158, drop-out holes 162 through a series of coiled springs 167 of greater diameter than the sheaths 49, each spring 167 connecting the drop-out hole 162 in the pick-up drum 128 with the sheath cartridge 168 on the sheath feeder 165. The sheath feeder 165 is illustrated in FIGS. 28, 29 and 30 and comprises a revolving positioning bar 169 having a plurality of sheath cartridge 168 extending therefrom. The positioning bar 169 is rotatable from a pick-up position where sheaths 49 are dropped through the coiled springs 167 into the sheath cartridges 168 to a loading position from which sheaths 49 are loaded onto the hub 47 of the syringe barrel 46. As can be seen in FIGS. 28, 29 and 30, an air cylinder 170 connected to a lever 171 rotates the positioning bar 169 from the 12 o'clock or pick-up position counterclockwise to the 9 o'clock or loading position. The entire positioning bar assembly 169 including the sheath receiving cartridges 168 is supported by a pair of guide rods 172 slidable in opposed journals 173 and is likewise movable from a pick-up position to a loading position, movement of the positioning bar 169 being accomplished by a second air cylinder 174. Referring to FIG. 30, the pick-up position of the assembly 165 is illustrated. After the sheath receiving cartridges 168 are loaded with sheaths 49 as previously described, the air cylinder 170 is activated to rotate the positioning bar 169 to the loading position where the sheath receiving cartridges 168 are in a horizontal position, the open end of the sheath 49 opposed to the needle 48 and hub 47 of the syringe barrel 46 retained on the core 51. At this point the carrier 50 with the molded syringe barrels 46 on the cores 51 thereof is positioned in the cradle 76 of the second trunnion transfer wheel 75 at the three o'clock position thereof where the cores 51 extend in a horizontal position, opposed to the sheath positioning bar 169 as previously explained. The second air cylinder 174 is activated after the positioning bar 169 is rotated to the loading position, to slide the entire assembly 169 forward on the guide rods 172 and load the sheaths 49 inserting them on the hub 47 of the syringe barrel 46 as the assembly 169 moves forward.

UNLOADING STATION

After the sheaths 49 are loaded onto the syringe barrels 46, as previously described, the molded parts 45 are completed as far as the second trunnion transfer wheel 75 is concerned. FIG. 31 best illustrates the sequence of activities which take place on the second trunnion transfer wheel 75. A carrier 50 enters the cradle 76 on the second trunnion transfer wheel 75 at the 12 o'clock position thereof and the wheel 75 is rotated to index the carrier 50 having the molded parts 45 thereon at the three o'clock or sheath feeding station where the sheaths 49 are inserted onto the syringe barrel 46 over the needle 48 as previously described. The trunnion transfer wheel 75 is then indexed to the five o'clock position or unloading station for stripping of the molded parts 45 from the cores 51. After the parts 45 are stripped from the cores 51 they are dropped onto conveying or transfer tubes 201 as hereinafter described, which convey the molded parts 45 to a drop-out assembly 220 from this parts 45 can be conveyed for further processing or storage.

Figure 33:
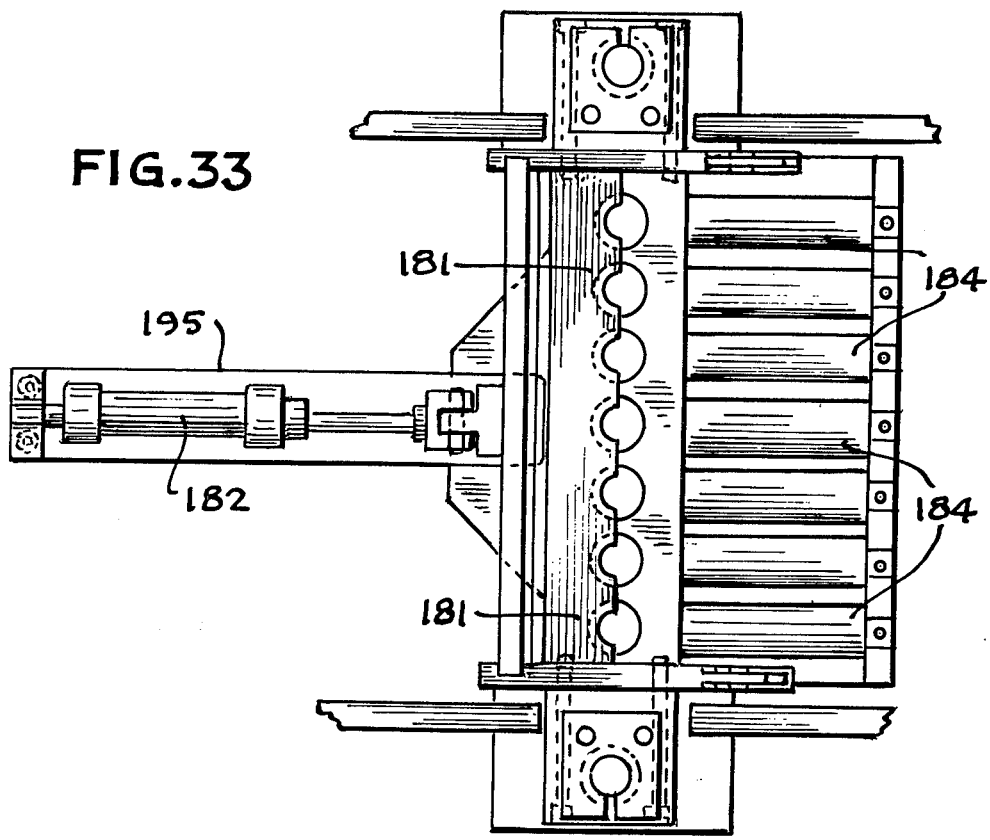
FIG. 33 is a top elevational view of the molded part unloading assembly for stripping the molded parts from the cores on the carrier.
Figure 34:
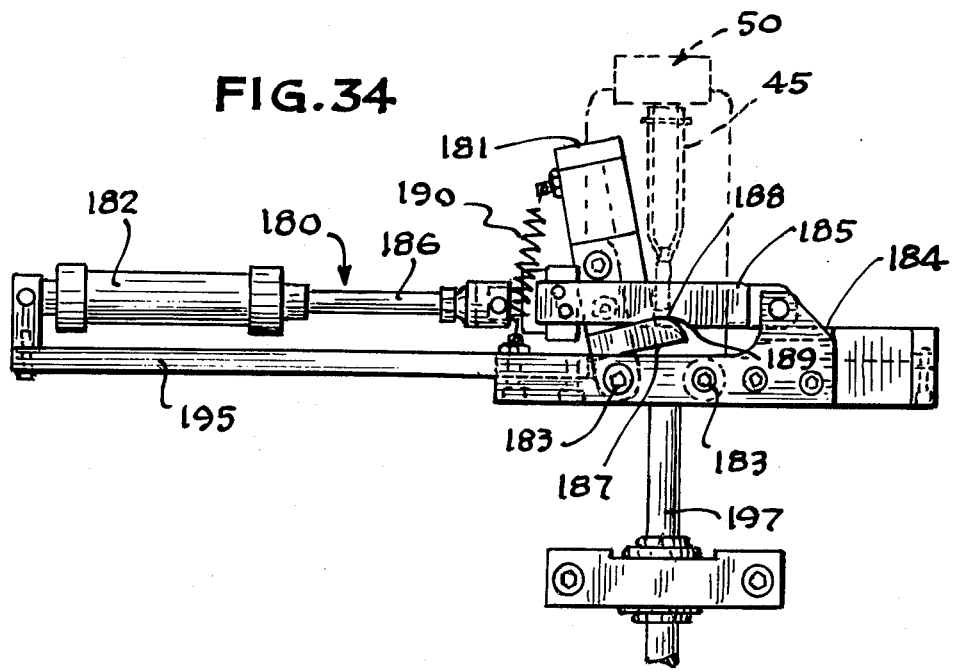
FIG. 34 is a side elevational view of the unloading and stripping assembly in FIG. 33.
Figure 35:
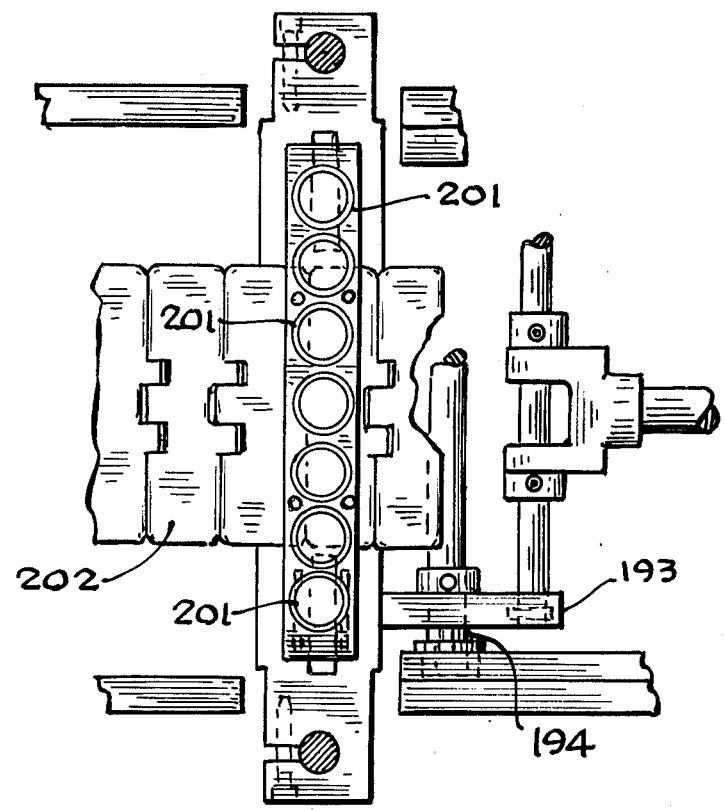
FIG. 35 is a top elevational view of the transport tubes positioned on the part conveyor and a portion of the part unloading and stripping assembly.

The unloading or stripping assembly 180 is illustrated in FIGS. 31, 33 and 34 and essentially comprises a pair of opposed, pivoted jaws 181, 184 activated by an air cylinder 182 for gripping, stripping, and releasing of the molded parts 45 from the cores 51. As best seen in FIG. 34, the stripping assembly 180 comprises a pair of opposed jaws 181, 184 pivoted about pins 183, one of the jaws 184 being connected by a pivoted bat 185 to the piston 186 of the air cylinder 182. The other of the jaws 181 has a base plate 187 at the bottom thereof, the end of the base plate 187 having a curved surface 188, the curved surface 188 of the base plate 187 mating with a curved depression 189 in the pivoted bar 185. The mating of the curved portion 188 of the base plate 187 and pivoted bar 185 results in gripping and releasing of the jaws 181 as the bar 185 moves back and forth. As the air cylinder 182 is activated to close the jaws 181, 184, the first jaw 184 pivots about the pivot pin 183 as the piston 186 of the air cylinder 182 is retracted, drawing back the pivoted bar 185 thereby bringing the jaw 184 about the pin 183 into engagement with the molded part 45 on the core 51 depending from the carrier 50. As the pivoted bar 185 is drawn back, the curved surface 188 on the base plate 187 of the jaw 181 rides on the bottom surface of the pivoted bar 185 and when it reaches the flat surface of the bar 185, the jaw 181 pivots about the pin 183 to engage the molded part 45 so that the molded part 45 is held firmly in the opposed jaws 181, 185 for removal of the part 45 from the core 51. The spring 190 acts to hold the jaw 181 open when the air cylinder 182 is in the retracted position.

Figure 36:
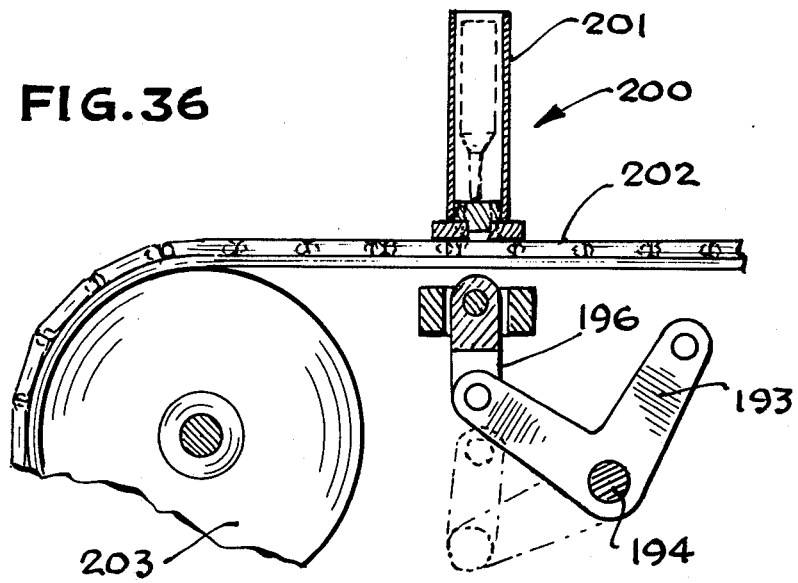
FIG. 36 is a side elevational view, partially in cross-section, of the assembly of FIG. 35.

Referring to FIGS. 31 and 36, the means for moving the stripping assembly 180 downwardly to pull the part 45 from the core 51 is illustrated. As seen in FIGS. 31 and 36, the piston 191 of an air cylinder 192 is moveably attached to a bell crank 193 pivoted on a pin 194, the other end of the bell crank 193 being attached to the support plate 195 of the stripping assembly 180 through a connecting link 196 and rod 197. The stripping assembly 180 in turn rides on guide bars mounted in bushings (not shown) so that the entire assembly 180 can be moved toward and away from the carrier 50 held in the cradle 76 on the trunnion transfer wheel 75 for gripping and removal of the part 45 from the core 51. After the jaws 181, 184 grip the part 45, the air cylinder 192 is activated to draw the stripping assembly 180 away from the core 51, as previously described, thereby pulling the parts 45 from the cores 51. The parts 45 are held within the jaws 181, 184 until the end of the stroke of the cylinder 192 so that the part 45 is positioned over a transfer tube 201, whereupon the air cylinder 182 which controls the jaws 181, 184 is activated to release the jaws 181, 184 and drop the part 45 into the tube 201 which is mounted on an endless belt 202.

PART CONVEYOR AND TRANSFER ASSEMBLY

After the parts 45 are removed from the cores 51 at the unloading station, they are dropped into transfer tubes 201 mounted on an endless belt 202 which revolves around a pair of opposed rollers 203; the parts contained within the tubes 201 with the sheath side down. Referring to FIGS. 1, 31, 35, 36, 37 and 38, the part conveyor 200 construction and operation is apparent. As illustrated in FIG. 1, a plurality of tubes 201, seven in the illustrated embodiment since the carriers 50 contain seven cores 51 and therefore seven parts 45 are molded at one time, are mounted on a conveyor 202 in an inline position to receive seven parts 45 from the stripping assembly 180 as previously described. The molded parts 45 are then conveyed from the end of the conveyor 202 adjacent the second trunnion transfer wheel 75 where they are removed from the carriers 50, to the opposite end of the conveyor 202 where they are transferred to a drop-out assembly 220, as best seen in FIGS. 37, 38, 39 and 40. As a bank of transfer tubes 201 containing parts 45 reaches the end of the conveyor 202, it goes around the end over the roller 203 where a curved plate 204 prevents the molded parts 45 from dropping out of the tubes 201. At the end of the curved plate 204 is a series of parts receiving feed tubes 205 which receive the syringe barrels 46 with the open end down for transfer to the drop-out assembly 220.

Figure 37:
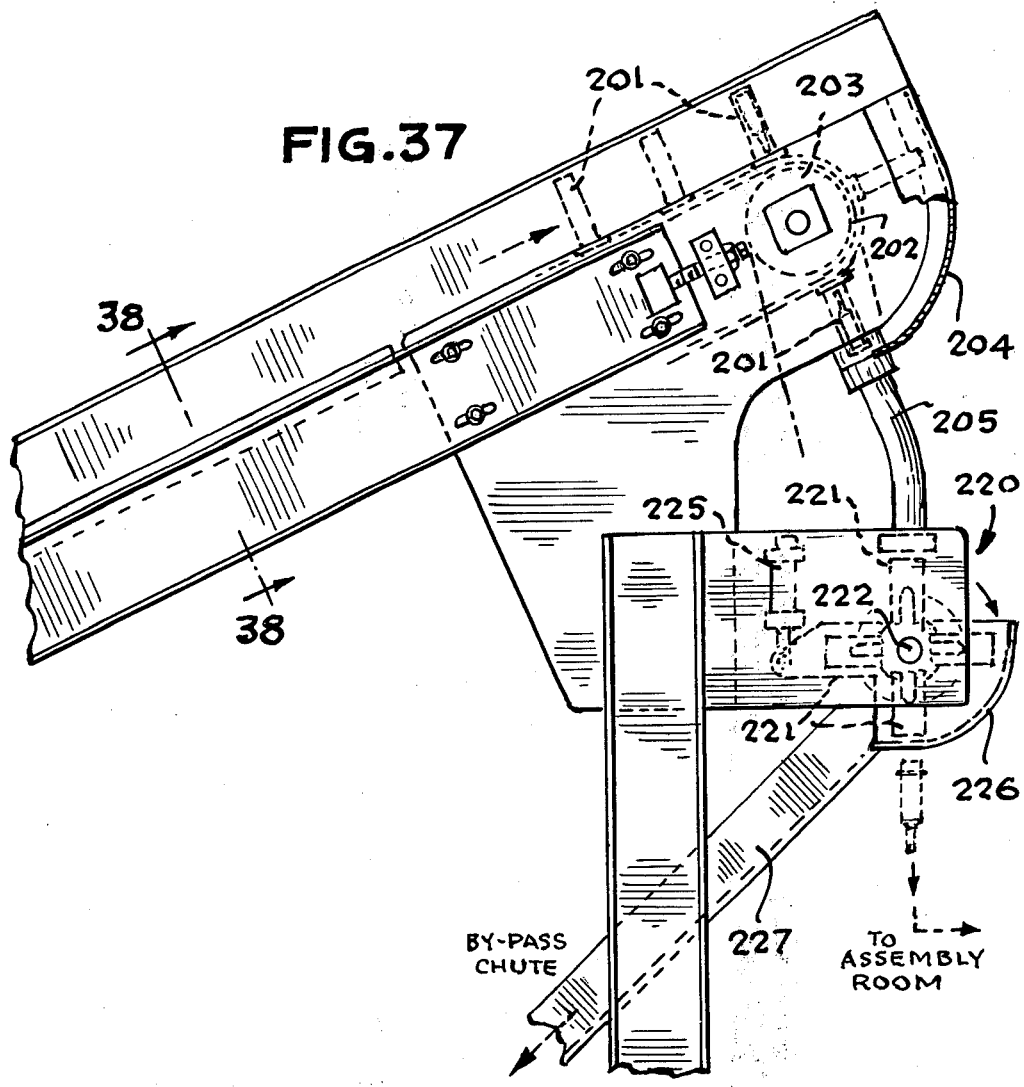
FIG. 37 is a side elevational view of the part conveyor and part transfer assembly illustrating transfer of the molded parts from the transfer tubes on the conveyor to the part transfer assembly.
Figure 38:
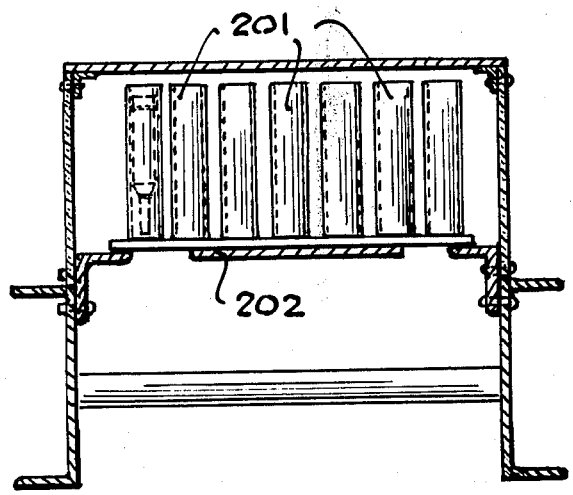
FIG. 38 is a rear elevational view, partially in cross-section, of the conveyor and part tranport tubes taken along the line 38—38 of FIG. 37.
Figure 39:
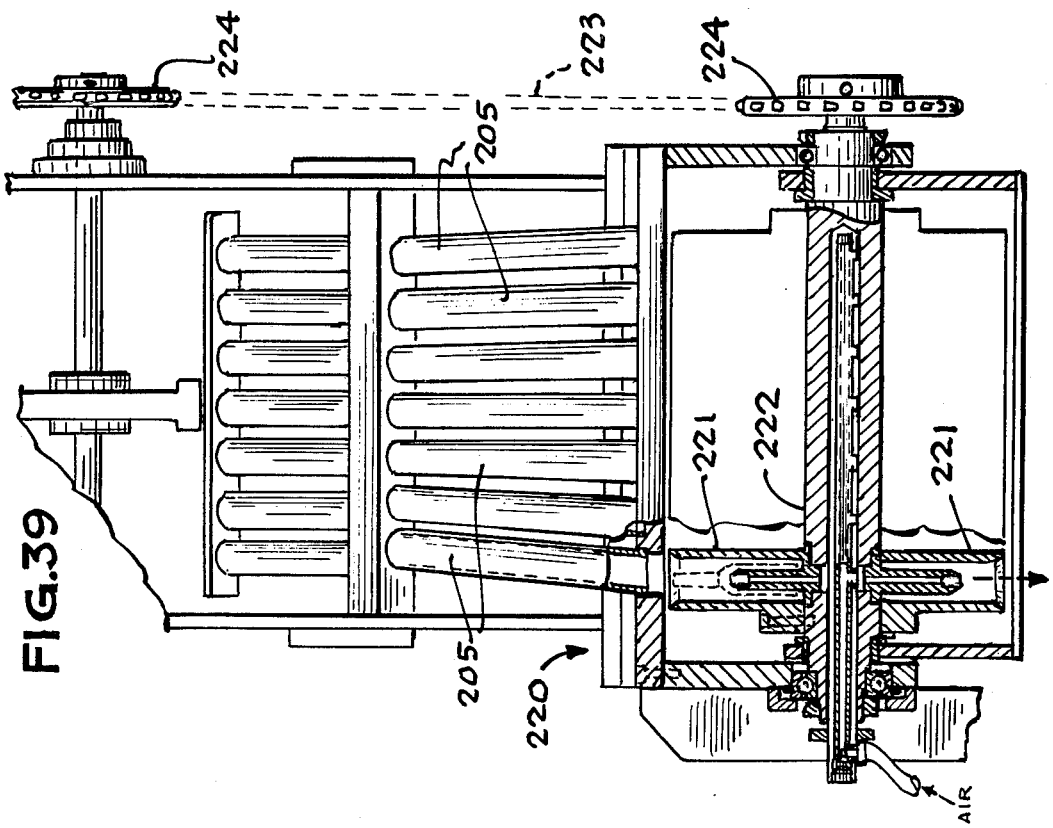
FIG. 39 is a front elevational view, partially in cross-section, of the part transfer assembly of FIG. 37.
Figure 40:
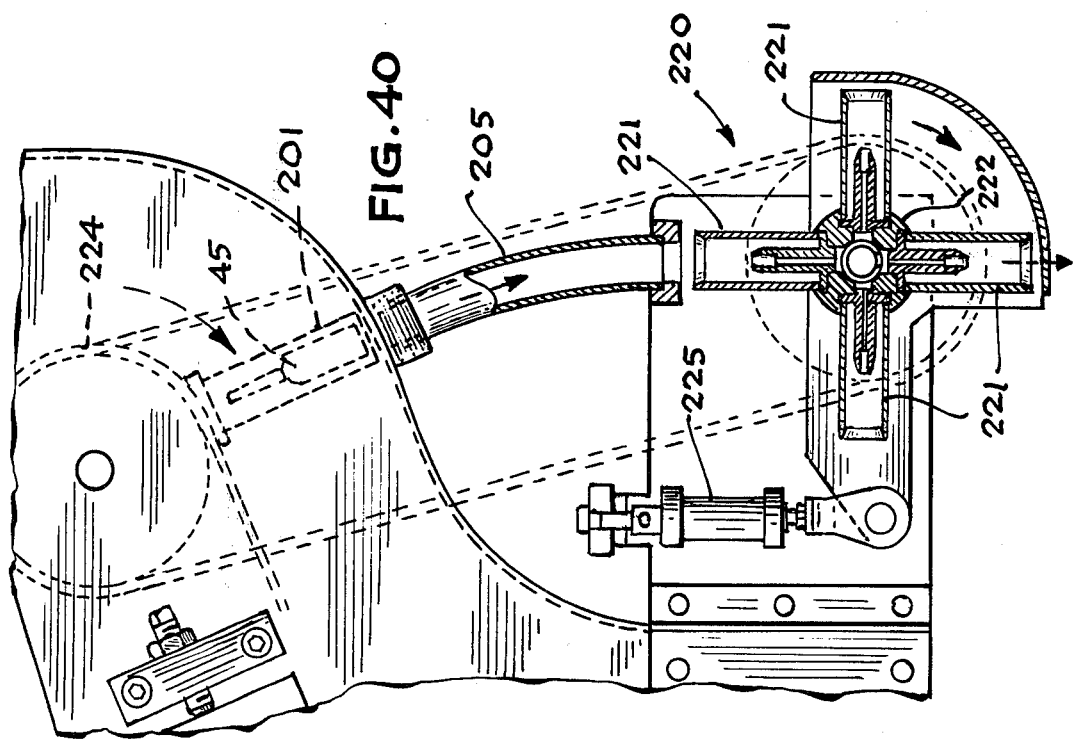
FIG. 40 is a side elevational view, partially in cross-section, of the part transfer assembly of FIG. 35.

The drop-out assembly 220, as illustrated in FIGS. 37, 39 and 40 comprises a series of receiving tubes 221 for molded parts 45 arranged in a bank in line at equal distance around the periphery of a rotating shaft 222. The drop-out assembly 220 is timed to the belt 202 by a connecting chain 223 and sprockets 224 so that the parts 45 arrive at the feed tubes 205, the receiving tubes 221 on the drop-out assembly 220 are positioned at the outlet of the feed tubes 205. The drop-out assembly 220 is rotated in 90° increments by an air cylinder 225 and the loaded parts 45 are prevented from falling out of the bottom of the bank of receiving tubes 221 by a curved cover 226 which seals the ends of the receiving tubes 221. The cover 226 is controlled by an air cylinder (not shown) so that parts 45 can be dropped on a conveyor (not shown) for transfer to further processing equipment, or, by leaving the cover 226 in place, as the receiving tubes 221 pass the end of the cover 226, the parts 45 will slide out and down a bypass chute 227 to a storage container (not shown) as illustrated in FIG. 37. By releasing the cover 226, the lower-most bank of receiving tubes 221 will be exposed so that the parts 45 will drop therefrom.

Synchronization of the various activities which take place on the molding apparatus 40 can be controlled by conventional means as described in connection with the needle feeding and carrier ejector assemblies. Likewise, all the portions of the apparatus 40 are driven by conventional means except as otherwise described.

What is claimed is:

1. In an apparatus for molding and assembling a syringe barrel having a needle hub with a needle molded therein and a sheath inserted on the hub to cover and protect the needle, said apparatus including a molding machine having mold sections for receiving a mold core, said apparatus comprising:
   a carrier having a mold core shaped to conform to the syringe barrel extending therefrom for presenting the mold core to said molding machine;
   a first rotatable, indexable trunnion transfer wheel positioned on one side of said molding machine and having a plurality of carrier receiving cradles on the periphery thereof, said first transfer wheel receiving and transferring said carrier to various positions around the periphery thereof;
   a needle feeding station positioned adjacent said first trunnion transfer wheel, said station including needle feeding means for positioning a needle in the core extending from the carrier, said transfer wheel being indexable to said needle feeding station;
   a second rotatable, indexable trunnion transfer wheel on the other side of said molding machine opposite said first trunnion transfer wheel and having a plurality of carrier receiving cradles on the periphery thereof, said second transfer wheel receiving and transferring said carrier with a molded syringe barrel thereon;
   a sheath feeding and loading station positioned adjacent said second trunnion transfer wheel, said station including sheath feeding and loading means for inserting a sheath on the needle hub on the syringe barrel;
   an unloading station positioned adjacent said second trunnion transfer wheel following said sheath feeding and loading station, said unloading station including unloading means for removing and releasing the molded syringe barrel from the core on the carrier, said second transfer wheel being indexable to said sheath feeding and loading and unloading stations;
   means for indexing said trunnion transfer wheels;
   conveyor means connecting said first trunnion transfer wheel, molding machine and second trunnion transfer wheel for transporting the carrier from the first transfer wheel to the mold in the molding machine to the second transfer wheel;
   driving means for moving said conveyor means to advance the carrier to and away from said molding machine from the first trunnion transfer wheel to the second trunnion transfer wheel;
   means for ejecting the carrier from the first trunnion transfer wheel onto the conveyor means;
   return means connecting the second trunnion transfer wheel and the first trunnion transfer wheel for transferring the carrier from the second trunnion transfer wheel back to the first trunnion transfer wheel after the molded and assembled syringe barrel has been removed from the core on the carrier; and
   means for ejecting the carrier from the second trunnion transfer wheel onto the return means.

2. The apparatus of claim 1 wherein said conveyor means comprises an endless chain revolving about a pair of opposed sprockets, one each of said sprockets positioned adjacent each of said trunnion transfer wheels.

3. The apparatus of claim 2 wherein the driving means for moving the conveyor comprises engageable rack and pinion gears, the pinion gear affixed to one of the sprockets and an air cylinder in engagement with the rack to drive the rack a predetermined distance, preselected to position the carrier within the mold in the molding machine and to transfer the carrier from the molding machine to a position adjacent the second trunnion transfer wheel after the molding cycle is completed.

4. The apparatus of claim 1 wherein the return means comprises an inclined track extending from the second trunnion transfer wheel to the first trunnion transfer wheel and comprising a pair of spaced, opposed beams having a plurality of spaced, opposed rollers affixed along the length thereof for receiving and transporting the carrier in an inverted position from the second trunnion transfer wheel to the first trunnion transfer wheel.

5. The apparatus of claim 1 including means for indexing said trunnion transfer wheels, said indexing means comprising a Geneva-Drive, clutch and brake combination, said Geneva-Drive being coupled to driving means through the clutch and brake.

6. The apparatus of claim 1 including elevator means for raising the carrier from the end of the return track adjacent the first trunnion transfer wheel to the bottom of the first trunnion transfer wheel preparatory to transfer of the carrier to the first trunnion transfer wheel.

* * * * *